(12) United States Patent
Cruz Morales et al.

(10) Patent No.: US 12,147,411 B2
(45) Date of Patent: Nov. 19, 2024

(54) SYSTEMS AND METHODS FOR MAINTAINING BIFURCATED DATA MANAGEMENT WHILE LABELING DATA FOR ARTIFICIAL INTELLIGENCE MODEL DEVELOPMENT

(71) Applicant: Capital One Services, LLC, McLean, VA (US)

(72) Inventors: Tania Cruz Morales, Washington, DC (US); Purva Shanker, Arlington, VA (US); Shannon Yogerst, New York, NY (US); Ignacio Espino, Arlington, VA (US); Dan Lin, Arlington, VA (US); Nathan Wolfe, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/156,140

(22) Filed: Jan. 18, 2023

(65) Prior Publication Data

US 2024/0241875 A1 Jul. 18, 2024

(51) Int. Cl.
*G06F 16/00* (2019.01)
*G06F 16/23* (2019.01)
*G06N 20/00* (2019.01)

(52) U.S. Cl.
CPC ............ *G06F 16/23* (2019.01); *G06N 20/00* (2019.01)

(58) Field of Classification Search
CPC  G06N 20/00; G06N 3/08; G06N 5/01; G06N 5/022; G06N 5/02; G06F 30/13; G06F 30/27; G06F 18/214; G06F 16/90335; G06F 16/908; G06F 16/93; G06F 18/2413; G06F 18/24323; G06F 18/2148; G06F 16/535; G06F 16/583; G06F 16/735; G06F 16/906; G06F 18/241; G06F 16/144; G06F 16/164; G06F 16/35; G06F 16/9535; G06F 8/33; G06F 2113/14; G06F 2113/16; G06F 30/12; G06F 30/18; G06F 3/0484; G06F 30/20; G06F 16/683; G06F 16/783
See application file for complete search history.

(56) References Cited

U.S. PATENT DOCUMENTS 11,373,117 B1 * 6/2022 Cui ................. G06F 16/285
11,875,230 B1 * 1/2024 Gokalp ............ G06F 16/2423

* cited by examiner

*Primary Examiner* — Shyue Jiunn Hwa
(74) *Attorney, Agent, or Firm* — Foley & Lardner LLP

(57) ABSTRACT

Systems and methods are described for maintaining bifurcated data management while labeling data for artificial intelligence model development. For example, the system may receive a first label for a first sample from a first dataset, wherein the first dataset is accessible to a first subset of a plurality of users, and wherein the first subset comprises a first attribute. The system may receive first version metadata of the first label, wherein the first version metadata comprises a proposed label for the first sample assigned by a first user. The system may determine, based on a first user input from the first user, a first grouping of source code files for storing the first version metadata, wherein the first grouping of source code files is accessible to a second subset of the plurality of users, and wherein the second subset comprises a second attribute.

19 Claims, 10 Drawing Sheets

FIG. 1B

SYSTEMS AND METHODS FOR MAINTAINING BIFURCATED DATA MANAGEMENT WHILE LABELING DATA FOR ARTIFICIAL INTELLIGENCE MODEL DEVELOPMENT

BACKGROUND

In recent years, the use of artificial intelligence, including, but not limited to, machine learning, deep learning, etc. (which may be referred to collectively herein as artificial intelligence models, machine learning models, or simply models), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be a difficult, time-consuming, and manual task.

SUMMARY

Methods and systems are described herein for novel uses and/or improvements to artificial intelligence applications. As one example, methods and systems are described herein for addressing data labeling challenges with a focus on data quality, data security, and operational workflow.

As a first technical challenge, the systems and methods address how to maintain the security of labeled data. For example, as data is labeled for artificial intelligence training purposes, the data needs to be collected and stored. However, while the data is collected and stored it often needs to undergo additional preprocessing (e.g., feature engineering) prior to being usable for training purposes. Performing preprocessing in this manner risks altering the data and/or exposing it to additional security risks. One solution to overcoming this problem is simply copying the data to a new database. While this approach prevents the original data from being altered, it increases the storage capacity needed as well as exposing the underlying data to additional security risks. In contrast to this approach, systems and methods are described for storing new versions of labels for previously labeled data in a separate workspace, while the original data and label remain in the original data store. By doing so, labeled data may be subjected to preprocessing for specific applications without creating a storage risk or substantially increasing required storage.

In some aspects, systems and methods are described for maintaining bifurcated data management while labeling data for artificial intelligence model development. For example, the system may receive a first label for a first sample from a first dataset, wherein the first dataset is accessible to a first subset of a plurality of users, and wherein the first subset comprises a first attribute. The system may receive first version metadata of the first label, wherein the first version metadata comprises a proposed label for the first sample assigned by a first user. The system may determine, based on a first user input from the first user, a first grouping of source code files for storing the first version metadata, wherein the first grouping of source code files is accessible to a second subset of the plurality of users, and wherein the second subset comprises a second attribute. The system may receive a second user input to generate training data for an artificial intelligence model based on version metadata of labels in the first grouping of source code files. The system may, in response to the second user input, generate a second dataset for training the artificial intelligence model based on the version metadata of the labels in the first grouping of source code files. The system may generate for display, in a user interface, a status notification for generation of the second dataset.

As a second technical challenge, the systems and methods address how to maintain the consistency of labeled data. For example, generating labels is a time-intensive process that requires contributions from numerous systems. Furthermore, even after data is labeled, the labeled data may need to be referenced during future labeling tasks. For example, in order to ensure consistency, previously labeled data may need to be compared to unlabeled data in order to ensure that the labeling is consistent (i.e., similar data receives similar labels). However, in many instances labeled data may undergo additional preprocessing (e.g., feature engineering) or supplementation (e.g., combining data with other data to create a feature input) prior to being usable for training purposes. This preprocessing and/or supplementation may result in additional security risks as the preprocessing may remove existing security measures (e.g., encryption) or may results in new security risks (e.g., supplementing data with personally identifiable information (PII) to generate the feature input). One solution to overcoming this problem is to store the labeled data (whether preprocessed or not) based on security classifications. While this approach prevents the labeled data from being exposed, it limits the ability of other users to reference the data. In contrast, the systems and methods describe assigning security rights to label versions and metadata as opposed to an individual record of the labeled data. By doing so, additional versions (e.g., of preprocessed labeled data) and/or some metadata may be used for comparisons, while preserving any security classifications.

In some aspects, systems and methods are described herein for maintaining rights management while labeling data for artificial intelligence model development. For example, the system may receive a first label for a first sample from a first dataset, wherein the first dataset is accessible to a first subset of a plurality of users. The system may receive first version metadata of the first label for the first sample, wherein the first label comprises a proposed label for the first sample assigned by a first user, and wherein the first version metadata is assigned to a first grouping of source code files, wherein the first grouping of source code files is accessible to a second subset of the plurality of users. The system may determine, based on a first user input from the first user, a first credential requirement for accessing the first version metadata. The system may receive, from a second user, a second user input requesting access to training data for an artificial intelligence model based on version metadata of labels in the first grouping of source code files. The system may, in response to the second user input, determine whether to grant access to the training data based on a first comparison of user profile data for the second user and the first credential requirement. The system may generate for display, in a user interface, the training data based on the comparison.

As a third technical challenge, the systems and methods address how to store labeled data that may have multiple versions. For example, while the data is collected and stored it often needs to undergo additional preprocessing (e.g., feature engineering) prior to being usable for training purposes while still preserving characteristics of the native data. One solution to overcoming any risk of losing characteristics is simply copying the native data to a new database. While this approach prevents the original data from being altered, it increases the storage capacity needed as well as creating downstream difficulties when merging multiple databases. In contrast, the system and methods describe storing new versions of labels in a single database using a two-dimensional (e.g., flat-file) repository. A flat-file database has no predetermined limit for the number of rows it might contain. Furthermore, the flat-file database provides an easy-to-access way to store the voluminous amount of labeled data (and its versions) that needs to be preserved in its native state. By doing so, labeled data may be stored in an efficient manner while allowing numerous applications to access and use the data.

In some aspects, systems and methods are described for storing versioned data while labeling data for artificial intelligence model development. For example, the system may receive a first label for a first sample from a first datastore, wherein the first datastore is accessible to a first subset of a plurality of users, and wherein the first datastore comprises a relational database. The system may receive first version metadata of the first label, wherein the first version metadata comprises a proposed label for the first sample assigned by a first user. The system may determine a second datastore for storing the first version metadata, wherein the second datastore is accessible to a second subset of the plurality of users, and wherein the second subset comprises a two-dimensional database, and wherein the first version metadata is assigned to a first row of the two-dimensional database. The system may receive a second user input to generate training data for an artificial intelligence model based on version metadata of labels in the second datastore. The system may, in response to the second user input, generate a second dataset for training the artificial intelligence model based on the version metadata of the labels in the second datastore. The system may generate for display, in a user interface, a status notification for generation of the second dataset.

As a fourth technical challenge, the systems and methods address how to increase the efficiency of data labeling. For example, generating labels is a time-intensive process that requires contributions from numerous systems. Furthermore, while the data is collected and stored it often needs to undergo additional preprocessing (e.g., feature engineering) prior to being usable for training purposes. This preprocessing is often specialized for a given application and as such requires specific oversight, workflows, and data transformations. To further complicate the preprocessing, in many instances, this preprocessing and/or supplementation may result in additional security risks as the preprocessing may remove existing security measures (e.g., encryption) or may result in new security risks (e.g., supplementing data with PII to generate the feature input). One solution to overcoming this problem is to store the labeled data (whether preprocessed or not) based on security classifications as the data is preprocessed. While this approach prevents the labeled data from being exposed, it limits the ability of other users to reference the data and select specific preprocessing operations as needed and delays the feature engineering workflow. In contrast, the systems and methods assign a feature engineering workflow in which steps of the workflow are assigned a given security level and/or performed within segmented workspaces. By doing so, the system allows labeled data to be subjected to preprocessing for specific applications through specific workspaces, allows for individual workspace owners to monitor progress, and allows workspace owners flexibility in selecting preprocessing steps and operations.

In some aspects, systems and methods are described for monitoring feature engineering workflows while labeling data for artificial intelligence model development. For example, the system may receive a first label for a first sample from a first dataset, wherein the first dataset is accessible to a first subset of a plurality of users. The system may receive a first user input to generate first version metadata of the first label. The system may, in response to receiving the first user input, determine a feature engineering workflow for generating the first version metadata. The system may determine, based on the feature engineering workflow, a first grouping of source code files corresponding to the feature engineering workflow. The system may determine, based on the first grouping of source code files, a first credential requirement for accessing the first version metadata. The system may receive, from a second user, a second user input requesting access to training data for an artificial intelligence model based on version metadata of labels in the first grouping of source code files. The system may, in response to the second user input, determine whether to grant access to the training data based on a first comparison of user profile data for the second user and the first credential requirement. The system may generate for display, in a user interface, the training data based on the comparison.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1B shows an illustrative diagram for a user interface representing multiple workspaces during data labeling, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
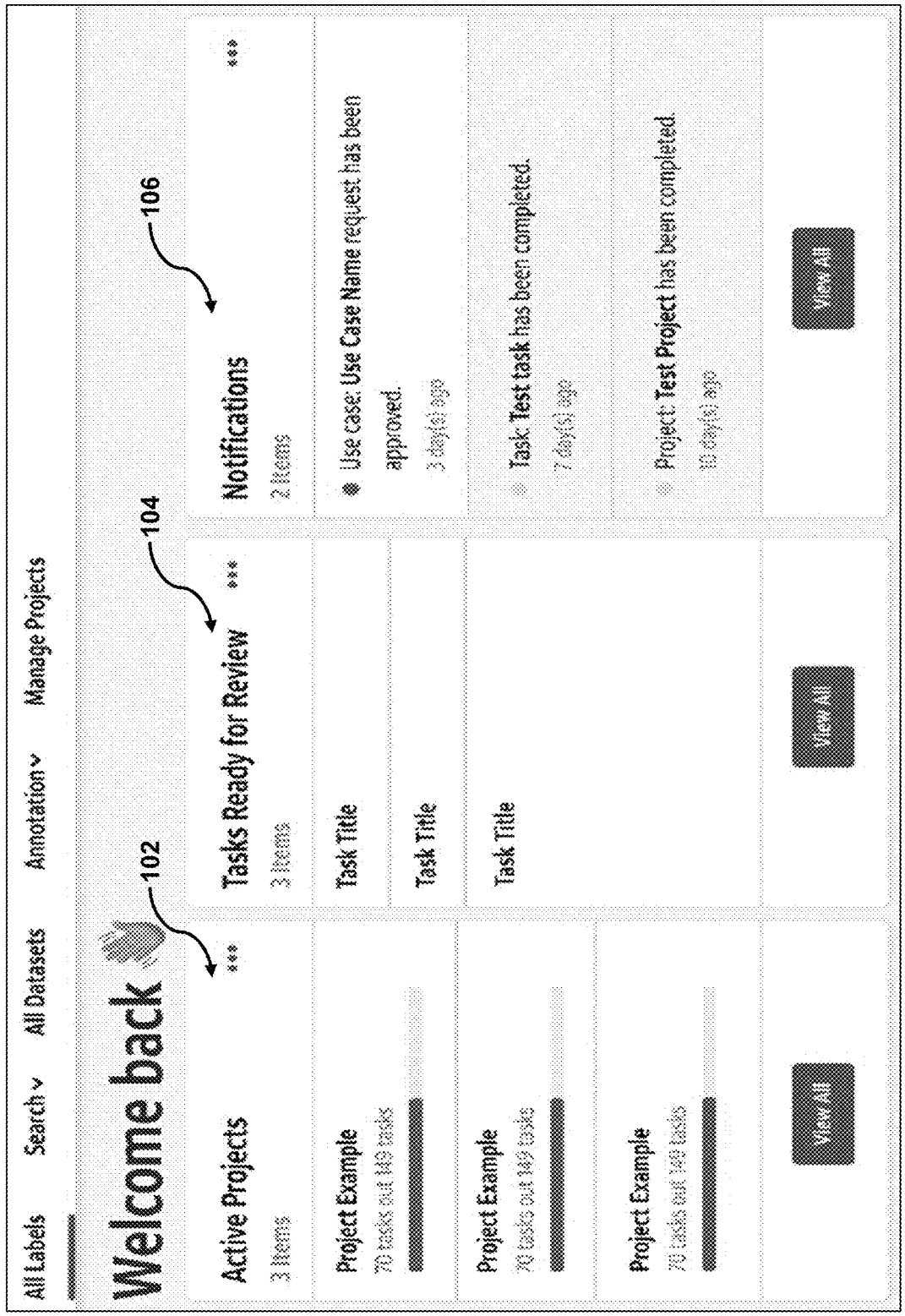
FIG. 1A shows an illustrative diagram for a user interface for data labeling during artificial intelligence model development, in accordance with one or more embodiments.

FIG. 1A shows an illustrative diagram for a user interface for data labeling during artificial intelligence model development, in accordance with one or more embodiments. For example, FIG. 1A shows user interface 100. User interface 100 may comprise a user interface for an artificial intelligence model development. For example, using user interface 100, a user may access active projects (e.g., project 102), review data labeling tasks (e.g., task 104), and/or receive one or more notifications (e.g., notification 106). For example, the system may perform data labeling (either automatically or manually). Data labeling is the process of identifying raw data (images, text files, videos, etc.) and adding one or more meaningful and informative labels to provide context so that a machine learning model can learn from it. As such, the system may receive a sample and determine a label for the sample.

As referred herein, a label may comprise any content. For example, the label may comprise a classifying phrase or name applied to a person or thing. In some embodiments, the label may comprise a potential intent or other classification of a user. For example, the label may comprise information about a user or received information. Additionally or alternatively, the label may include a quantitative or qualitative metric of the determine accuracy of a label (e.g., a categorization applied to a record).

In some embodiments, user interface 100 may be used for maintaining rights management while labeling data for artificial intelligence model development. For example, the system may receive a first label for a first sample from a first datastore. It should be noted that a sample may comprise any type of content. In some embodiments, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

Using user interface 100, the system may receive a plurality of user inputs into a user interface of an artificial intelligence model development. In some embodiments, a "user interface" may comprise a human-computer interaction and communication in a device, and may include display screens, keyboards, a mouse, and the appearance of a desktop. For example, a user interface may comprise a way a user interacts with an application or a website.

The system may then determine, based on the plurality of user inputs, first version metadata of the first label for the first sample, wherein the first label comprises a proposed label for the first sample assigned by a first user. The system may use one or more data labeling techniques. For example, the system may use internal labeling, which involves using in-house data science experts to generate labels. By doing so, the system simplifies tracking, provides greater accuracy, and increases quality. However, this approach typically requires more time and favors large companies with extensive resources. Additionally or alternatively, the system may use synthetic labeling. This approach generates new project data from pre-existing datasets, which enhances data quality and time efficiency. However, synthetic labeling requires extensive computing power, which can increase costs. Additionally or alternatively, the system may use programmatic labeling, which may comprise automated data labeling processes that use scripts to reduce time consumption and the need for human annotation. However, the possibility of technical problems requires HITL to remain a part of the quality assurance (QA) process. Additionally or alternatively, the system may use outsourcing and/or crowdsourcing. These approaches are quicker and more cost-effective due to their micro-tasking capability and web-based distribution. However, worker quality, QA, and project management vary across crowdsourcing platforms.

As referred to herein, a dataset may include a collection of related sets of information that is composed of separate elements but can be manipulated as a unit by a computer. The dataset may comprise any content. For example, the content may comprise all types of information that may be relevant for computing purposes and in particular for labeling purposes. For example, the dataset may comprise a list of labels that includes potential intents of data, categories of data, etc.

Figure 1B:
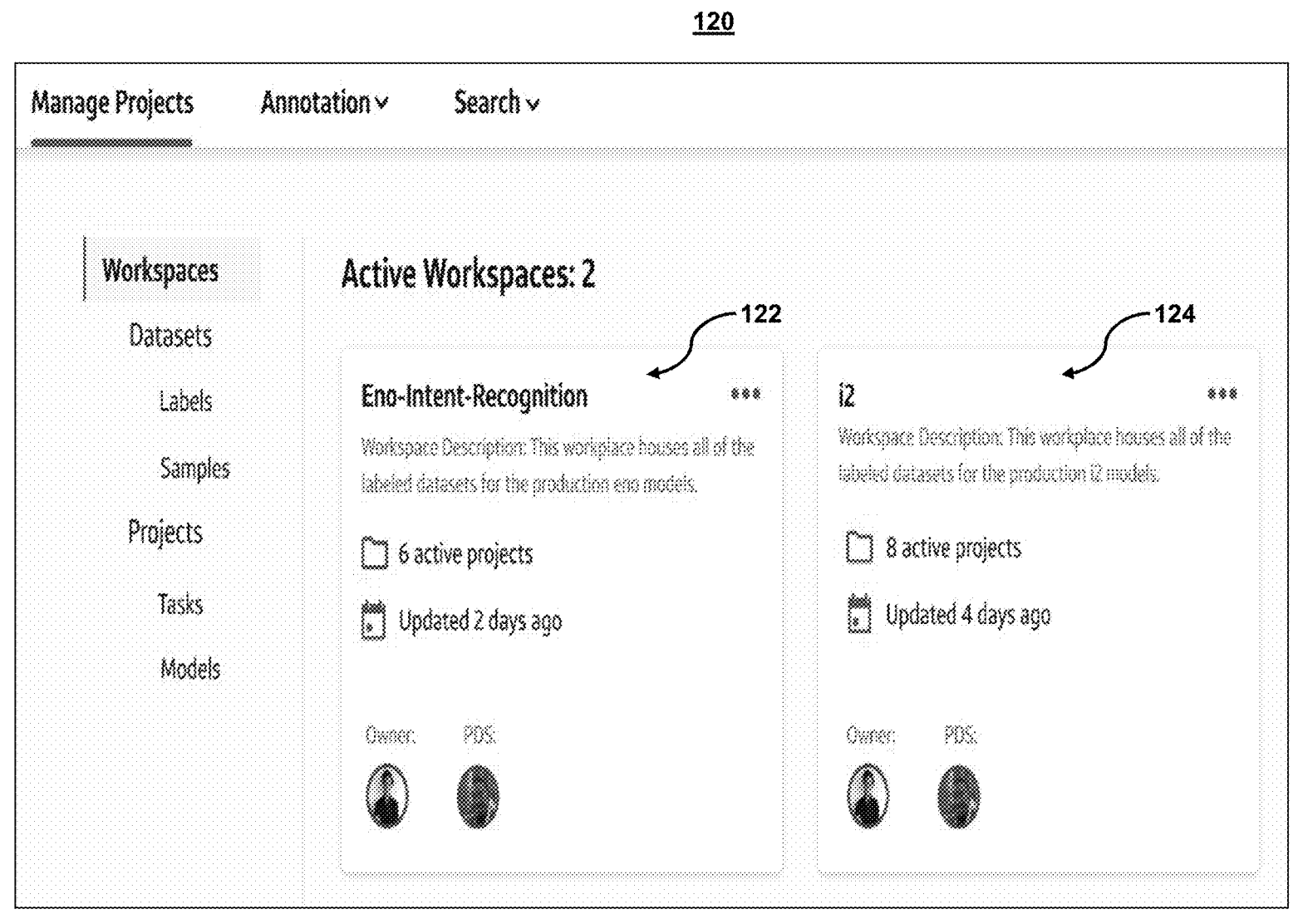

FIG. 1B shows an illustrative diagram for a user interface representing multiple workspaces during data labeling, in accordance with one or more embodiments. For example, the system may manage information and segregate data between different workspaces (e.g., workspace 122 and workspace 124) as shown in user interface 120. In software development, a workspace is a grouping of source code files that make up a larger unit, like a web page, website, or program. The workspace is usually a file or directory. For software as a service, a workspace describes online applications that allow users to organize and exchange files with other users over the Internet. In a graphical interface, a workspace is a grouping of application windows used by a window manager application to help reduce clutter on the desktop screen. Workspaces are commonly found on Unix operating systems.

For example, the system may assign the first version metadata to a first workspace (e.g., workspace 122), wherein the first workspace is accessible to a second subset of the plurality of users (e.g., users having credentials to access the first workspace). The system may determine, based on a first user input from a first user, a first credential requirement for accessing the first version metadata. The system may then use this credential requirement to determine whether to grant access to the training data. For example, the system may receive, from a second user, a second user input requesting access to training data for an artificial intelligence model based on version metadata of labels in the first workspace. In response to the second user input, the system may determine whether to grant access to the training data based on a first comparison of user profile data for the second user and the first credential requirement.

The system may monitor content generated by the user and/or about the user to generate user profile data. In some embodiments, "a user profile" and/or "user profile data" may comprise data actively and/or passively collected about a user. For example, the user profile data may comprise content generated by the user and a user attribute for the user. A user profile may be content consumed and/or created by a user. In some embodiments, an attribute may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

Figure 1C:
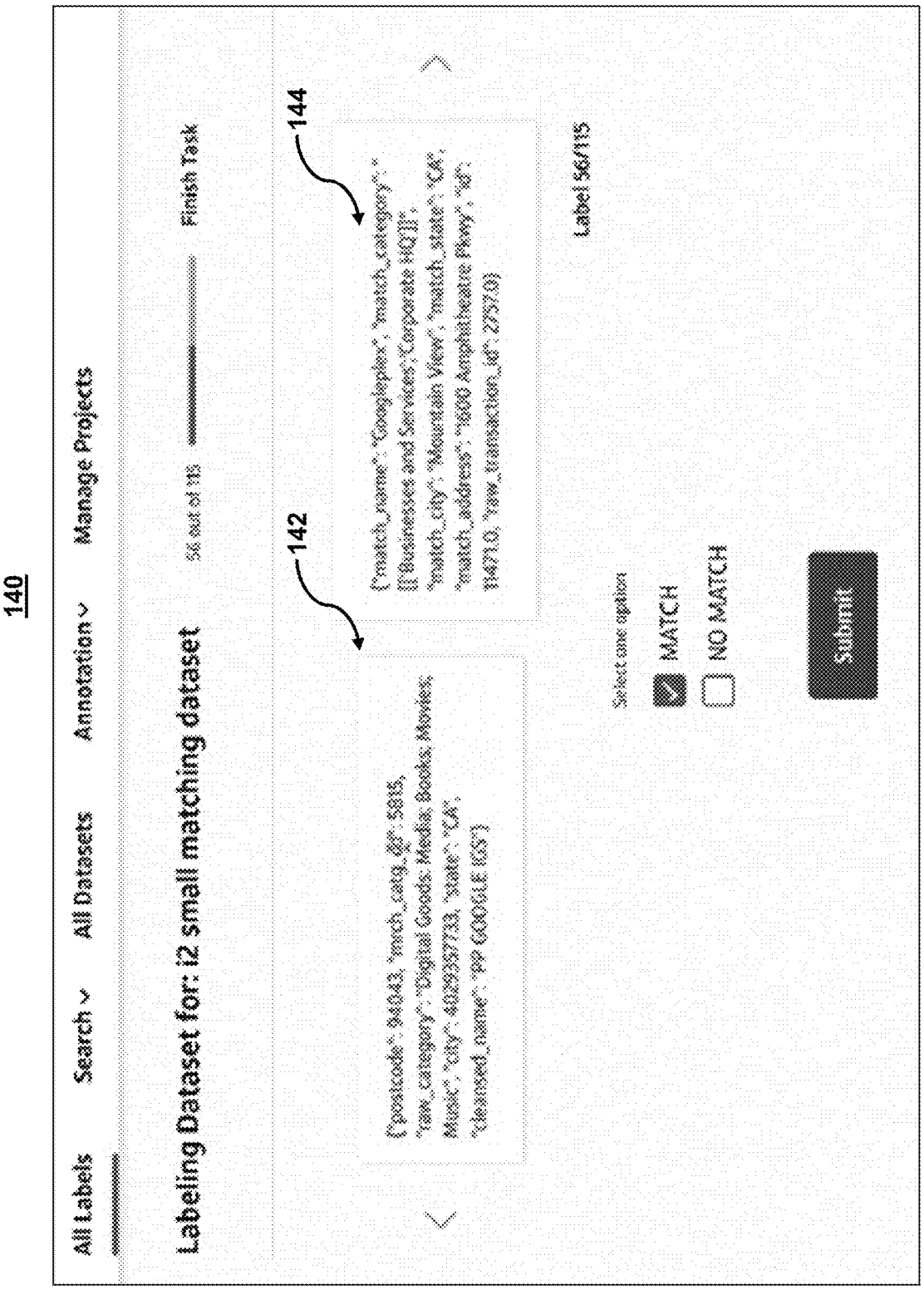
FIG. 1C shows an illustrative diagram for a user interface performing consistency review during data labeling, in accordance with one or more embodiments.

FIG. 1C shows an illustrative diagram for a user interface performing consistency review during data labeling, in accordance with one or more embodiments. For example, in response to determining to grant access to the training data based on a first comparison of user profile data and a first credential requirement, the system may present user interface 140. For example, user interface 140 shows the comparison of first version metadata (e.g., metadata 142) and second version metadata (e.g., metadata 144). For example, the system may compare similar version metadata for a label to previous versions to ensure quality and/or consistency. For example, in order to ensure consistency, previously labeled data may need to be compared to unlabeled data in order to ensure that the labeling is consistent (i.e., similar data receives similar labels).

During the comparison, the system may analyze the metadata for similarities and compare a consistency determined based on the similarities to a threshold similarity. For example, the system may determine to store a first version metadata in a datastore specific to a workspace. The datastore may comprise a two-dimensional database, wherein the first version metadata is assigned to a first row of the two-dimensional database. The system may use a flat-file database to ease review and/or retrieval of data. Flat-file databases are useful as easy-to-create and easy-to-maintain data files for commonly accessed information such as name and address files, labels, etc. A flat-file database's simplicity is advantageous as a low-overhead, easy-to-access way to store voluminous information that needs to be preserved in its native state.

For example, using user interface 140, a user may retrieve the version metadata of labels from the datastore. Notably, the system may use a flat file for storing the version metadata. A flat file is a collection of data stored in a two-dimensional database in which similar yet discrete strings of information are stored as records in a table. The columns of the table represent one dimension of the database, while each row is a separate record. The information stored in a flat file is generally alphanumeric with little or no additional formatting. The structure of a flat file is based on a uniform format as defined by the type and character lengths described by the columns. By doing so, the version metadata may be easily annotated, new version metadata may be easily added, and/or current version metadata may be easily compared. In some embodiments, the system may use a comma-separated values (CSV) file. A CSV file is one in which table data is gathered in lines of American Standard Code for Information Interchange (ASCII) text with the value from each table cell separated by a comma and each row represented by a new line. Columns and rows are typically delimited by tabs or commas, such as in CSV files. A flat-file database comprises a single table.

The system may then compare the version metadata of labels for consistency. In some embodiments, the system may use a flat-file database to ease comparison of data and/or in the management of object-oriented storage systems. Object storage is commonly used by cloud storage services because it can accommodate massive volumes of data. The data stored on object systems is managed by a non-hierarchical flat-file database that retains basic information about the data, such as the file names and where they are stored on media.

In some embodiments, the system may display native data for the first sample. For example, the version metadata may include native data as well as any transformer data (e.g., describing one or more transformations during feature engineering). Native data may comprise native data or native data-formats comprising data that originates from and/or relates to the unlabeled data sourced from a raw data source (e.g., datastore 206 ((FIG. 2)). In some embodiments, native data may include data resulting from native code, which is code written specifically for an application, received from an application, and/or a respective plugin designed therefor.

The feature transformation data may be presented in any format and/or representation of data that can be naturally read by humans. In some embodiments, the feature transformation data may appear as a text string. For example, the feature transformation data may comprise a description of one or more features and/or a feature engineering workflow performed on the native data. In such cases, determining a feature engineering workflow (and/or individual tasks, feature nodes, etc.) may comprise determining a plurality of nodes for feature engineering workflow as well as information about each node.

Figure 1D:
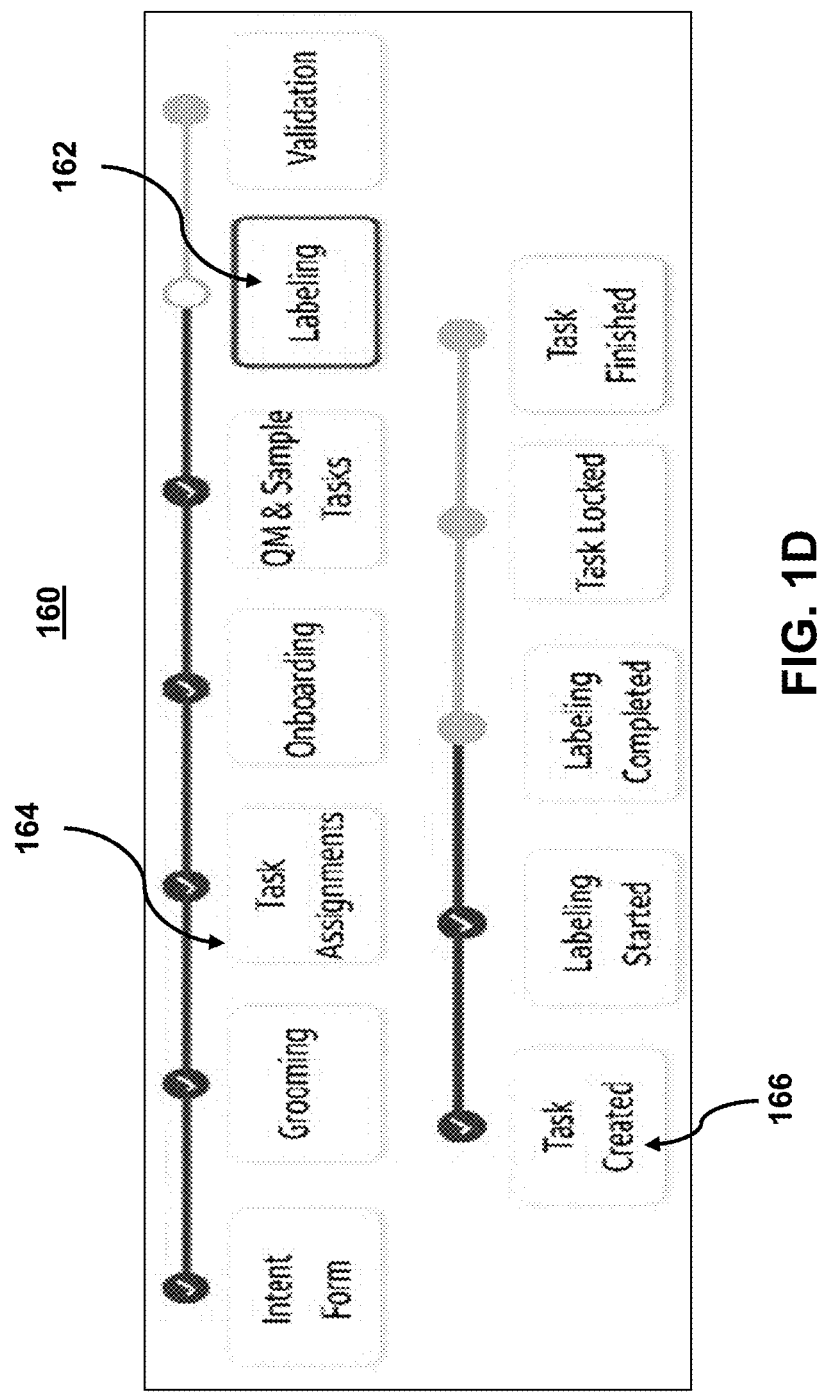
FIG. 1D shows an illustrative diagram for a feature engineering workflow, in accordance with one or more embodiments.

FIG. 1D shows an illustrative diagram for a feature engineering workflow, in accordance with one or more embodiments. For example, in addition to the uses, notifications, etc., described above, the system may be used for monitoring feature engineering workflows while labeling data for artificial intelligence model development.

Methods and systems are described herein for novel uses and/or improvements to generating, training, and formatting data for artificial intelligence applications. As one example, methods and systems are described herein for generating, storing, and modifying data for feature engineering purposes. Feature engineering is the process of using domain knowledge to extract features (characteristics, properties, attributes, etc.) from raw data. By extracting these features, the system may improve the quality of results from a machine learning process as compared with supplying only the raw data to the machine learning process.

Traditionally, data scientists need to determine the data flow and manually code every step in a feature engineering pipeline. The development is time-consuming and error-prone if the feature engineering is complex and the pipeline is large. Furthermore, as each machine learning application is different, the features needed and the feature engineering pipeline used to generate those features are unique. As such, each new machine learning application typically starts with a feature engineering pipeline development project. The added burden of developing this feature engineering pipeline presents an additional technical challenge for artificial intelligence applications.

To overcome these technical deficiencies in feature engineering, the system may comprise a feature engineering pipeline management system. The feature engineering pipeline management system may monitor the status of one or more feature engineering projects (e.g., based on one or more datasets and/or knowledge databases). Each project may comprise selected and transformed variables created using a predictive machine learning or statistical model. Each project may comprise feature creation, feature transformation, feature extraction, and/or feature selection.

For example, feature creation may comprise creating new features from existing data to generate better predictions. In some embodiments, the system (e.g., model 302 (FIG. 3) below) may use feature creation techniques including: one-hot-encoding, binning, splitting, and calculated features. In another example, feature transformation and imputation may comprise replacing missing features or features that are not valid. The system (e.g., model 302 (FIG. 3) below) may use techniques that include: forming Cartesian products of features, non-linear transformations (such as binning numeric variables into categories), and/or creating domain-specific features. In yet another example, feature extraction may involve reducing the amount of data to be processed using dimensionality reduction techniques. The system (e.g., model 302 (FIG. 3) below) may use techniques including: Principal Component Analysis (PCA) and Linear Discriminant Analysis (LDA), which reduces the amount of memory and computing power required, while still accurately maintaining original data characteristics. In yet another example, feature selection may involve selecting a subset of extracted features. The system (e.g., model 302 (FIG. 3) below) may use this to minimize the error rate of a trained model as feature importance score and correlation matrix may be factors in selecting the most relevant features for model training.

In some embodiments, the system may determine a feature engineering workflow (e.g., workflow 160) for generating the first version metadata. Feature engineering is the process of selecting, manipulating, and transforming raw data into features that can be used in artificial intelligence learning. For example, feature engineering may leverage data to create new variables that are not in an existing training set. Additionally or alternatively, featuring engineering may produce new features for both supervised and unsupervised learning, with the goal of simplifying and speeding up data transformations while also enhancing model accuracy.

The feature engineering workflow may comprise a plurality of feature nodes, and wherein each feature node corresponds to respective feature transformation data. For example, each feature node (e.g., node 162 or node 164) may correspond to one or more transformations and/or other processes applied to data during the feature engineering process. The combination of these transformations may comprise a feature engineering workflow (e.g., workflow 160). Furthermore, each feature node may comprise additional tasks (e.g., an additional subset of transformations) corresponding to each feature node. These additional nodes (e.g., node 166) may also comprise additional transformations. For example, the feature node may comprise a connection point which corresponds to and/or performs a transformation. The feature node may correspond to a particular reformatting process, quality check, and/or other step during an engineering workflow.

For example, feature transformer data corresponding to node 166 may comprise code that describes one or more transformations of native data. Feature transformer data corresponding to node 166 may comprise a log transform, a scaling operation, and/or a normalization/standardization of native data. For example, after a scaling operation, the continuous features become similar in terms of range. Distance-based algorithms like k-NN and k-Means require scaled continuous features as model input. Similarly, standardization (also known as z-score normalization) is the process of scaling values while accounting for standard deviation. If the standard deviation of features differs, the range of those features will likewise differ. The effect of outliers in the characteristics is reduced as a result. To arrive at a distribution with a 0 mean and 1 variance, all the data points are subtracted by their mean and the result divided by the distribution's variance.

In contrast, feature transformer data corresponding to node 166 may comprise code that describes one or more transformations of native data (e.g., data received by a node corresponding to feature transformer data). Feature transformer data corresponding to node 166 may comprise one-hot encoding. A one-hot encoding is a type of encoding in which an element of a finite set is represented by the index in that set, where only one element has its index set to "1" and all other elements are assigned indices within the range [0, n-1]. In contrast to binary encoding schemes, where each bit can represent two values (e.g., 0 and 1), this scheme assigns a unique value for each possible case.

In some embodiments, the values, parameters, and/or other data corresponding to the feature transformer data may be selected and/or generated as an output of an artificial intelligence model (e.g., model 302 (FIG. 3)). For example, as described above, feature engineering (and/or training a model therefor) may comprise selecting and transforming variables when creating a predictive model using machine learning or statistical modeling. In particular, the system may generate feature transformation data that optimizes the feature creation, feature transformation, feature extraction, and feature selection. With deep learning, the feature engineering is automated as part of the algorithm learning.

Figure 2:
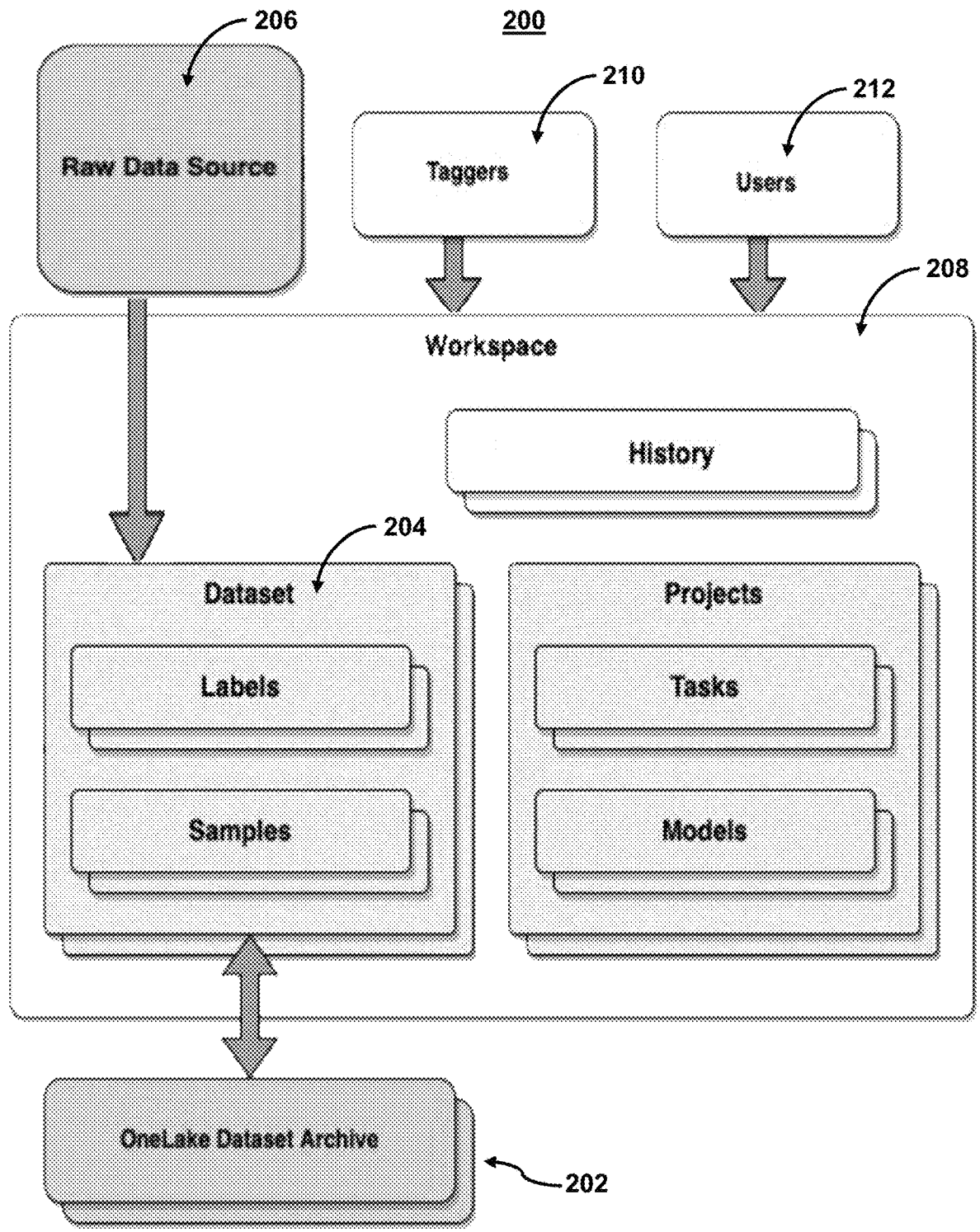
FIG. 2 shows an illustrative diagram for components used while labeling data for artificial intelligence model development, in accordance with one or more embodiments.

FIG. 2 shows an illustrative diagram for components used while labeling data for artificial intelligence model development, in accordance with one or more embodiments. For example, system 200 may comprise maintaining bifurcated data management while labeling data for artificial intelligence model development. As shown in FIG. 2, system 200 may comprise several components.

System 200 comprises a first datastore (e.g., datastore 202), wherein the first datastore is accessible to a first subset of a plurality of users, wherein the first subset comprises a first attribute, wherein the first datastore comprises a first dataset, and wherein the first datastore comprises a relational database that stores a plurality of samples. For example, the first datastore (e.g., datastore 202) may comprise a relational database that comprises a plurality of samples. The relational database may receive user inputs to update versions of labels and/or perform other changes to data. The first datastore may then push the dataset changes to a labeled data archive specific to the first grouping of source code files. A relational database is a collection of data items with pre-defined relationships between them. These items are organized as a set of tables with columns and rows. Tables are used to hold information about the objects to be represented in the database. For example, the relational database may comprise a set of tables corresponding to a dataset archive. The dataset archive may comprise samples and versions of labels corresponding to each sample. A relational database contains multiple tables of data that relate to each other and allows the user to specify information about multiple tables and the relationships between those tables, allowing more flexibility and control over database constraints.

System 200 comprises a second datastore (e.g., datastore 204), wherein the second datastore is specific to a first grouping of source code files (e.g., a first workspace). For example, the second datastore (e.g., datastore 204) may comprise a dataset that is specific to a first grouping of source code files and/or a labeled data archive specific to the first grouping of source code files. The second datastore may comprise labels and/or samples related to the labeled data archive. Additionally or alternatively, the second datastore may comprise a history specific to the labeled data archive as well as any current projects and/or tasks. Using the second datastore users and/or taggers may access the labeled data archive to perform one or more operations on the data in the labeled data archive.

The first grouping of source code files may be accessible to a second subset of the plurality of users, wherein the second subset comprises a second attribute. For example, the second datastore may be specific to a workspace. In some embodiments, the second datastore may comprise a labeled data archive specific to the first grouping of source code files. For example, the system may use one or more relational databases and/or flat-file databases. A flat file consists of a single table of data. It allows the user to specify data attributes, such as columns and data types table by table, and stores those attributes separate from applications. This type of file is commonly used to import data in data warehousing projects.

System 200 comprises a third datastore (e.g., datastore 206), wherein the third datastore is accessible to a third subset of the plurality of users, wherein the third subset comprises a third attribute, and wherein the third datastore comprises unlabeled data sourced from the first datastore. For example, the third datastore may comprise a raw data source (e.g., datastore 206). In some embodiments, the raw unlabeled data may be sourced from a commonly accessible data lake. For example, the third datastore may comprise a data lake. A data lake is a system or repository of data stored in its natural/raw format, usually object blobs or files. A data lake is usually a single store of data including raw copies of source system data, sensor data, social data, etc., and transformed data used for tasks such as reporting, visualization, advanced analytics and machine learning. A data lake can include structured data from relational databases (rows and columns), semi-structured data (CSV, logs, XML, JSON), unstructured data (emails, documents, PDFs) and binary data (images, audio, video).

System 200 comprises workspace 208, which may correspond to a workspace accessed via user interfaces in FIGS. 1A-D. For example, workspace 208 may be accessed by data labelers (e.g., taggers 210) and/or other users (e.g., users 212).

Figure 3:
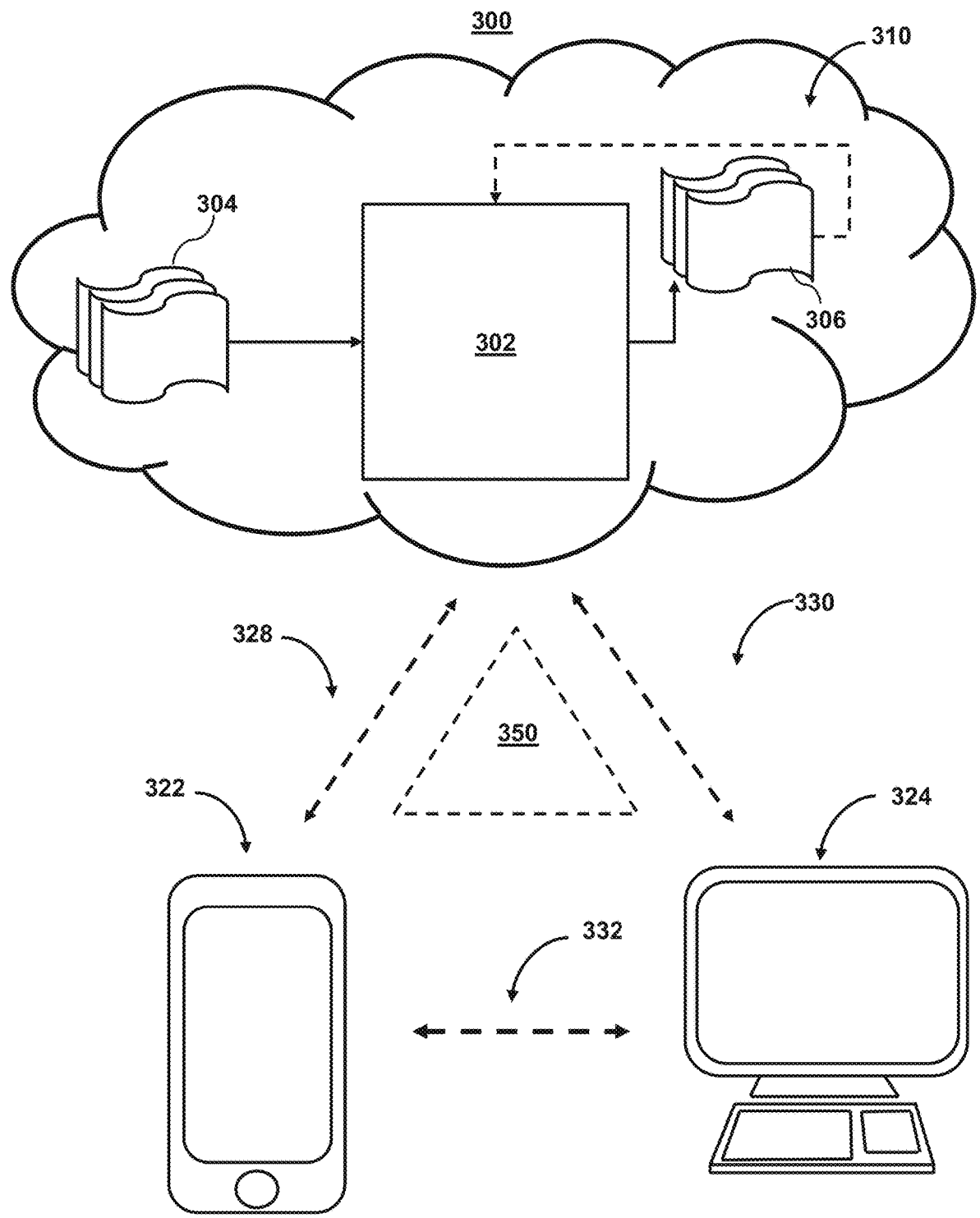
FIG. 3 shows illustrative components for a system used for data labeling, in accordance with one or more embodiments.

FIG. 3 shows illustrative components for a system used for data labeling, in accordance with one or more embodiments. For example, FIG. 3 may show illustrative components for data labeling. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and a personal computer, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more of the components described in FIG. 2. Cloud components 310 may also include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., consistency of labels, predicted labels, version metadata, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., consistency of labels, predicted labels, version metadata, etc.).

In some embodiments, the model (e.g., model 302) may automatically perform actions based on outputs 306. In some embodiments, the model (e.g., model 302) may not perform any actions. The output of the model (e.g., model 302) may be used to determine the consistency of labels, predict labels, generate version metadata, etc.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
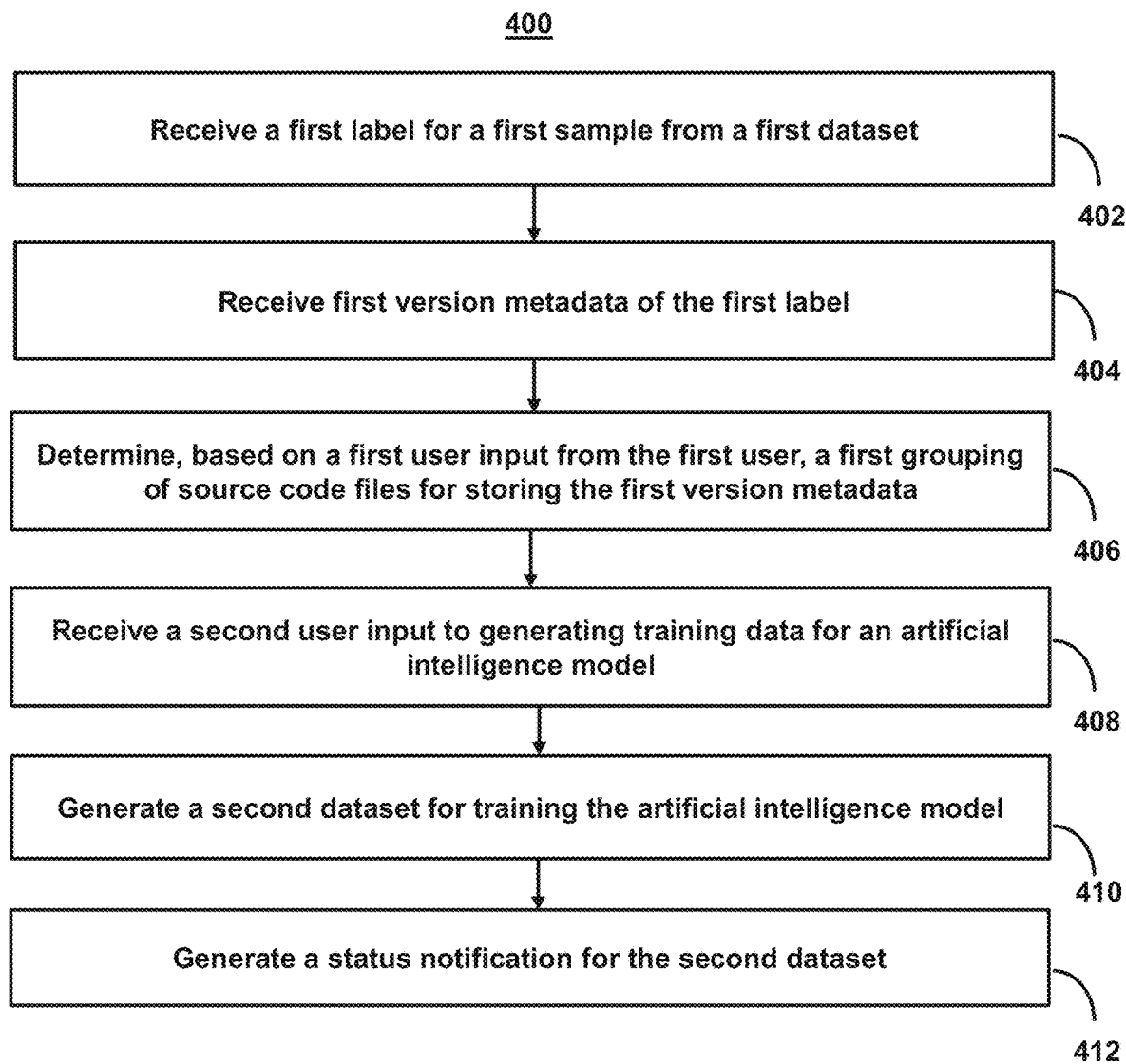
FIG. 4 shows a flowchart of the steps involved in maintaining bifurcated data management while labeling data for artificial intelligence model development, in accordance with one or more embodiments.

FIG. 4 shows a flowchart of the steps involved in maintaining bifurcated data management while labeling data for artificial intelligence model development, in accordance with one or more embodiments. For example, the system may use process 400 (e.g., as implemented on one or more system components described above) for data labeling.

At step 402, process 400 (e.g., using one or more components described above) receives a first label for a first sample from a first dataset. For example, the system may receive a first label for a first sample from a first dataset, wherein the first dataset is accessible to a first subset of a plurality of users, and wherein the first subset comprises a first attribute. For example, the system may use a bifurcated data management arrangement in which certain data and/or datasets are only available (or accessible) to specific users. The availability and/or accessibility of the data and/or dataset may be defined by an attribute of the user (or user group). For example, the attribute may comprise any characteristic that distinguishes one user (or user group) from another. For example, an attribute may comprise a role of a user, a task assigned/performed by a user, a permission or security credential of the user, a workspace of the user, etc.

At step 404, process 400 (e.g., using one or more components described above) receives first version metadata of the first label. For example, the system may receive first version metadata of the first label, wherein the first version metadata comprises a proposed label for the first sample assigned by a first user. For example, the system may receive one or more user inputs that generate metadata for a label. In some embodiments, this metadata may comprise a new version of a label (or modification to an existing label). Additionally or alternatively, the version metadata may comprise additional information used to determine a consistency or other characteristic.

In some embodiments, the version metadata may comprise multiple types of information.

For example, the system may receive a user input indicating that the first label is consistent with other labels in a given label category. For example, the system may retrieve the first version metadata (e.g., metadata 142 (FIG. 1C)) and compare it with known metadata for a known label (e.g., metadata 144 (FIG. 1C)). For example, the system may determine a label category for the first label. The system may retrieve a known label having the label category. The system may compare a consistency between the first label and the known label.

In some embodiments, the first version metadata may comprise a user confirmation that a given label for a sample matches labels of similar samples. In such cases, the system may receive a user input indicating that the labels match (e.g., as shown in FIG. 1C). The system may record this confirmation in the version metadata. By doing so, the system may allow users within a given workspace to indicate which labels are similar (or not similar) and may thus adjust the training data for a given workspace. For example, the system may generate for display the first label simultaneously with a known label. The system may receive a user confirmation that the first label is consistent with the known label.

In some embodiments, the first version metadata may comprise information about a category within which the label belongs. For example, the label category may indicate a potential use for the label, a context of the label, etc. The system may categorize the labels as well as generate a confidence level for the categorization. By doing so, the system may allow users within a given workspace to indicate which labels are similar (or not similar) and may thus adjust the training data for a given workspace. For example, the system may receive a label category for the first label. The system may receive a confidence level of the first label, wherein the confidence level indicates a likelihood that the first label is consistent with other labels in the label category.

In some embodiments, the first version metadata may comprise a confidence level (e.g., either assigned manually or automatically). The system may then compare the confidence level to a threshold confidence level. By doing so, the system may allow users within a given workspace to indicate which labels are similar (or not similar) as well as how confident any given label must be for the training purposes in a given workspace. For example, the system may receive a threshold confidence level for the first grouping of source code files. The system may compare the confidence level to the threshold confidence level.

At step 406, process 400 (e.g., using one or more components described above) determines, based on a first user input from the first user, a first grouping of source code files for storing the first version metadata. For example, the system may determine, based on a first user input from the first user, a first grouping of source code files for storing the first version metadata, wherein the first grouping of source code files is accessible to a second subset of the plurality of users, and wherein the second subset comprises a second attribute. For example, the system may store the first version metadata separately from the first label (e.g., the current label for a sample) as well as the first sample. By doing so, the system may preserve storage space while also allowing other users and/or workspaces to access the first label and/or first sample.

In some embodiments, the system may allow only users with a given attribute to access and/or store metadata in a given workspace. As such, the system may verify information about the user (e.g., based on user profile data) prior to allowing a user to access and/or modify information in a given workspace. For example, the system may determine a credential requirement for accessing the first grouping of source code files. The system may compare the second attribute to the credential requirement.

At step 408, process 400 (e.g., using one or more components described above) receives a second user input to generate training data for an artificial intelligence model. For example, the system may receive a second user input to generate training data for an artificial intelligence model based on version metadata of labels in the first grouping of source code files. For example, the system may comprise an artificial intelligence model development that allows for the monitoring of feature engineering workflows.

At step 410, process 400 (e.g., using one or more components described above) generates a second dataset for training the artificial intelligence model. For example, the system may, in response to the second user input, generate a second dataset for training the artificial intelligence model based on the version metadata of the labels in the first grouping of source code files. For example, the system may retrieve the various version metadata labels for the workspace and generate a set of training data based on them. As such, the training data is specific to the workspace.

At step 412, process 400 (e.g., using one or more components described above) generates a status notification for the second dataset. For example, the system may generate for display, in a user interface, a status notification for generation of the second dataset. The system may generate information about the training data such as characteristics of the training data, results from use of the training data, comparisons of the training data with other datasets (e.g., from the first dataset), etc.

In some embodiments, the system may generate information about a sample, label, and/or other information that may assist a user and/or other system in reviewing a labeling decision. In some embodiments, the system may review a labeling decision for consistency. The system may generate for display native data corresponding to the first sample. The system may generate for display feature transformation data for the first sample.

In some embodiments, the system may generate information about a sample, label, and/or other information that relates to the training data. For example, the system may generate one or more metrics about the size, makeup, and/or other information about the samples in the training data. By doing so, the system may allow users in a given workspace to better define the qualities of the training data without affecting the original training data. The system may determine a total number of samples in the second dataset. The system may generate for display the total number of samples.

In some embodiments, the system may generate information about a sample, label, and/or other information that may be used to compare training data from different datasets (and/or workspaces). For example, the system may describe a number, size, average confidence level, average consistency level, etc. for a given dataset (or workspace). The system may then compare this metric to generate recommendations about the quality of a current dataset. By doing so, the system may predict whether a current dataset is likely to suffer bias or other issues related to the data used. For example, the system may determine a first metric for samples in the first dataset. The system may determine a second metric for samples in the second dataset. The system may generate for display a comparison of the first metric and second metric.

In some embodiments, the system may receive additional annotations to metadata, a label, a sample, and/or a dataset. The system may limit the application of this annotation to data in a given workspace (e.g., in a given dataset). The system may receive a user annotation to the second dataset. The system may store the user annotation in the second dataset.

In some embodiments, the system may receive additional annotations to metadata, a label, a sample, and/or a dataset. The system may then automatically apply this annotation to the metadata for other labels in the workspace. By doing so, the system may quickly and efficiently populate changes to training data in a given workspace. For example, the system may generate for display an option to annotate the first version metadata. The system may receive an annotation to the first version metadata. The system may automatically modify, based on the annotation, the version metadata of labels in the first grouping of source code files.

In some embodiments, the system may maintain separate access requirements (e.g., users may require different security credentials) for different types of data, including metadata for samples. As such, the system may require users to have a first level of access to access a version metadata, a second level of access to access a label corresponding to the version metadata, and/or a third level of access to access a sample corresponding to the version metadata and/or label. By doing so, the system may maintain security of some data (e.g., by not exposing PII to unauthorized users), while still allowing users access to other types of data needed to train (and/or make adjustments to) an artificial intelligence model. For example, the system may receive a third user input to access the first version metadata. The system may determine whether to grant access to the first version metadata based on a first comparison of user profile data and a first credential requirement. The system may receive a fourth user input to access the first label. The system may determine whether to grant access to the first label based on a fourth comparison of the user profile data and a second credential requirement.

The system may require a user to have a particular attribute or attributes to access different types of data. These attributes may comprise a role, an authorization, a relationship to a given workspace, and/or a security credential. For example, the system may apply different security requirements to the first label, first sample, and/or first dataset than the first version metadata. By doing so, the first version metadata may be more secured (e.g., through more advanced encryption). The system may determine a user requesting the first label. The system may determine a user profile for the user. The system may determine a first credential for accessing the first dataset. The system may determine whether to grant access to the first dataset based on a first comparison of the user profile data and the first credential requirement.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
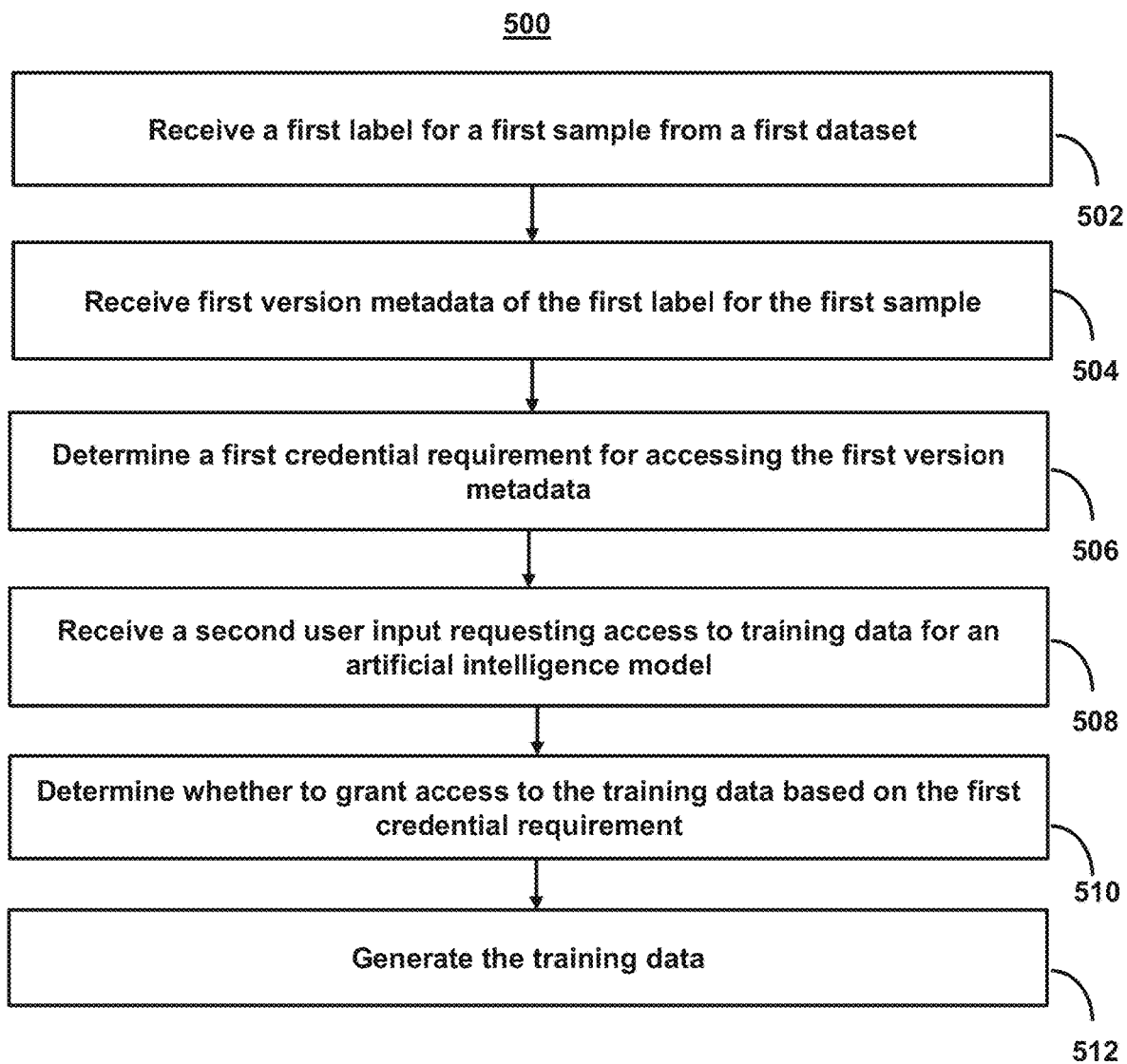
FIG. 5 shows a flowchart of the steps involved in maintaining rights management while labeling data for artificial intelligence model development, in accordance with one or more embodiments.

FIG. 5 shows a flowchart of the steps involved in maintaining rights management while labeling data for artificial intelligence model development, in accordance with one or more embodiments. For example, the system may use process 500 (e.g., as implemented on one or more system components described above) for data labeling.

At step 502, process 500 (e.g., using one or more components described above) receives a first label for a first sample from a first dataset. For example, the system may receive a first label for a first sample from a first dataset, wherein the first dataset is accessible to a first subset of a plurality of users. For example, the system may use a bifurcated data management arrangement in which certain data and/or datasets are only available (or accessible) to specific users. The availability and/or accessibility of the data and/or dataset may be defined by an attribute of the user (or user group). For example, the attribute may comprise any characteristic that distinguishes one user (or user group) from another. For example, an attribute may comprise a role of a user, a task assigned/performed by a user, a permission or security credential of the user, a workspace of the user, etc.

In some embodiments, the system may maintain separate access requirements (e.g., users may require different security credentials) for different data. The system may require users to have a first level of access to access a first dataset and/or datastore and a second level of access to access a second dataset. For example, the first label may comprise a second credential requirement. The system may receive the first label for the first sample from the first dataset and may determine whether to grant access to the first dataset based on a second comparison of the user profile data and the second credential requirement.

In some embodiments the first datastore may comprise a relational database service that pushes changes to a specific archive (e.g., corresponding to a given workspace). Each archive may itself have a project database service that may store workspace, project, and task-specific information. The system may determine a first labeled data archive corresponding to a current workspace. The system may retrieve the first label from the first labeled data archive.

At step 504, process 500 (e.g., using one or more components described above) receives first version metadata of the first label for the first sample. For example, the system may receive first version metadata of the first label for the first sample, wherein the first version metadata is assigned to a first grouping of source code files, and wherein the first grouping of source code files is accessible to a second subset of the plurality of users. For example, the system may receive one or more user inputs that generate metadata for a label. In some embodiments, this metadata may comprise a new version of a label (or modification to an existing label). Additionally or alternatively, the version metadata may comprise additional information used to determine a consistency or other characteristic.

In some embodiments, the system may receive one or more inputs into a user interface for a workspace. The one or more inputs may cause data within the workspace to be modified and/or stored in the workspace. Notably, the data outside the workspace (e.g., data from other datasets) is not affected. The system may receive a first user input of a proposed label for the first sample as assigned by a first user. The system may receive a second user input to store the proposed label to the first sample in the first grouping of source code files.

In some embodiments, the system may receive one or more inputs into a user interface for a workspace that may cause the data within the workspace to be altered. As one example, the data in the workspace may be updated with a proposed label for a sample. In such cases, the system may add a pointer to a location of the sample (e.g., stored in another dataset) in order to conserve overall resources. The system may update a first record in the first grouping of source code files with a proposed label for the first sample as assigned by a first user. The system may update a second record in the first grouping of source code files with a pointer to a location of the first sample.

In some embodiments, the first version metadata may comprise information about a category within which the label belongs. For example, the label category may indicate a potential use for the label, a context of the label, etc. The system may categorize the labels as well as generate a confidence level for the categorization. By doing so, the system may allow users within a given workspace to indicate which labels are similar (or not similar) and may thus adjust the training data for a given workspace. The system may receive a label category for the first label. The system may receive a confidence level of the first label, wherein the confidence level indicates a likelihood that the first label is consistent with other labels in the label category.

In some embodiments, the first version metadata may comprise a confidence level (e.g., either assigned manually or automatically). The system may then compare the confidence level to a threshold confidence level. By doing so, the system may allow users within a given workspace to indicate which labels are similar (or not similar) as well as how confident any given label must be for the training purposes in a given workspace. The system may receive a threshold confidence level for the first grouping of source code files. The system may compare the confidence level to the threshold confidence level.

At step 506, process 500 (e.g., using one or more components described above) determines a first credential requirement for accessing the first version metadata. For example, the system may determine, based on a first user input from a first user, a first credential requirement for accessing the first grouping of source code files. For example, the system may apply different security requirements to the first label, first sample, and/or first dataset than the first version metadata. By doing so, the first version metadata may be more secured (e.g., through more advanced encryption).

At step 508, process 500 (e.g., using one or more components described above) receives a second user input requesting access to training data for an artificial intelligence model. For example, the system may receive, from a second user, a second user input requesting access to training data for an artificial intelligence model based on version metadata of labels in the first grouping of source code files. For example, the system may comprise an artificial intelligence model development that allows for the monitoring of feature engineering workflows.

The system may use a flat-file database to ease review and/or retrieval of data. Flat-file databases are useful as easy-to-create and easy-to-maintain data files for commonly accessed information such as name and address files, labels, etc. A flat-file database's simplicity is advantageous as a low-overhead, easy-to-access way to store voluminous information that needs to be preserved in its native state. The system may retrieve the version metadata of labels from the first grouping of source code files. In some embodiments, the system may use a flat-file database to ease comparison of data and/or in the management of object-oriented storage systems. Object storage is commonly used by cloud storage services because it can accommodate massive volumes of data. The data stored on object systems is managed by a non-hierarchical flat-file database that retains basic information about the data, such as the file names and where they are stored on media. For example, the system may compare the version metadata of labels for consistency. The system may determine that the version metadata of labels has a threshold level of consistency. For example, the system may compare similar version metadata for a label to previous versions to ensure quality and/or consistency.

At step 510, process 500 (e.g., using one or more components described above) determines whether to grant access to the training data based on the first credential requirement. For example, the system may, in response to the second user input, determine whether to grant access to the training data based on a first comparison of user profile data for the second user and the first credential requirement. For example, the system may retrieve the various version metadata labels for the workspace and generate a set of training data based on them. As such, the training data is specific to the workspace.

At step 512, process 500 (e.g., using one or more components described above) generates the training data. For example, the system may generate for display, in a user interface, the training data based on the first comparison. The system may generate information about the training data such as characteristics of the training data, results from use of the training data, comparisons of the training data with other datasets (e.g., from the first dataset), etc.

In some embodiments, the system may generate information about a sample, label, and/or other information that may assist a user and/or other system in reviewing a labeling decision. In some embodiments, the system may review a labeling decision for consistency. For example, the system may generate for display native data corresponding to the first sample. The system may generate for display feature transformation data for the first sample.

In some embodiments, the system may generate information about a sample, label, and/or other information that relates to the training data. For example, the system may generate one or more metrics about the size, makeup, and/or other information about the samples in the training data. By doing so, the system may allow users in a given workspace to better define the qualities of the training data without affecting the original training data. The system may determine a total number of samples in the training data. The system may generate for display the total number of samples.

In some embodiments, the system may maintain separate access requirements (e.g., users may require different security credentials) for different types of data, including metadata for samples. As such, the system may require users to have a first level of access to access a version metadata, a second level of access to access a label corresponding to the version metadata, and/or a third level of access to access a sample corresponding to the version metadata and/or label. By doing so, the system may maintain security of some data (e.g., by not exposing PII to unauthorized users), while still allowing users access to other types of data needed to train (and/or make adjustments to) an artificial intelligence model. The system may receive a third user input to access the first version metadata. The system may determine whether to grant access to the first version metadata based on a third comparison of the user profile data for the second user and a third credential requirement. Additionally or alternatively, the system may receive a fourth user input to access the first label. The system may determine whether to grant access to the first label based on a fourth comparison of the user profile data for the second user and a fourth credential requirement. Additionally or alternatively, the system may receive a fifth user input to access the first sample. The system may determine whether to grant access to the first sample based on a fifth comparison of the user profile data for the second user and a fifth credential requirement.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
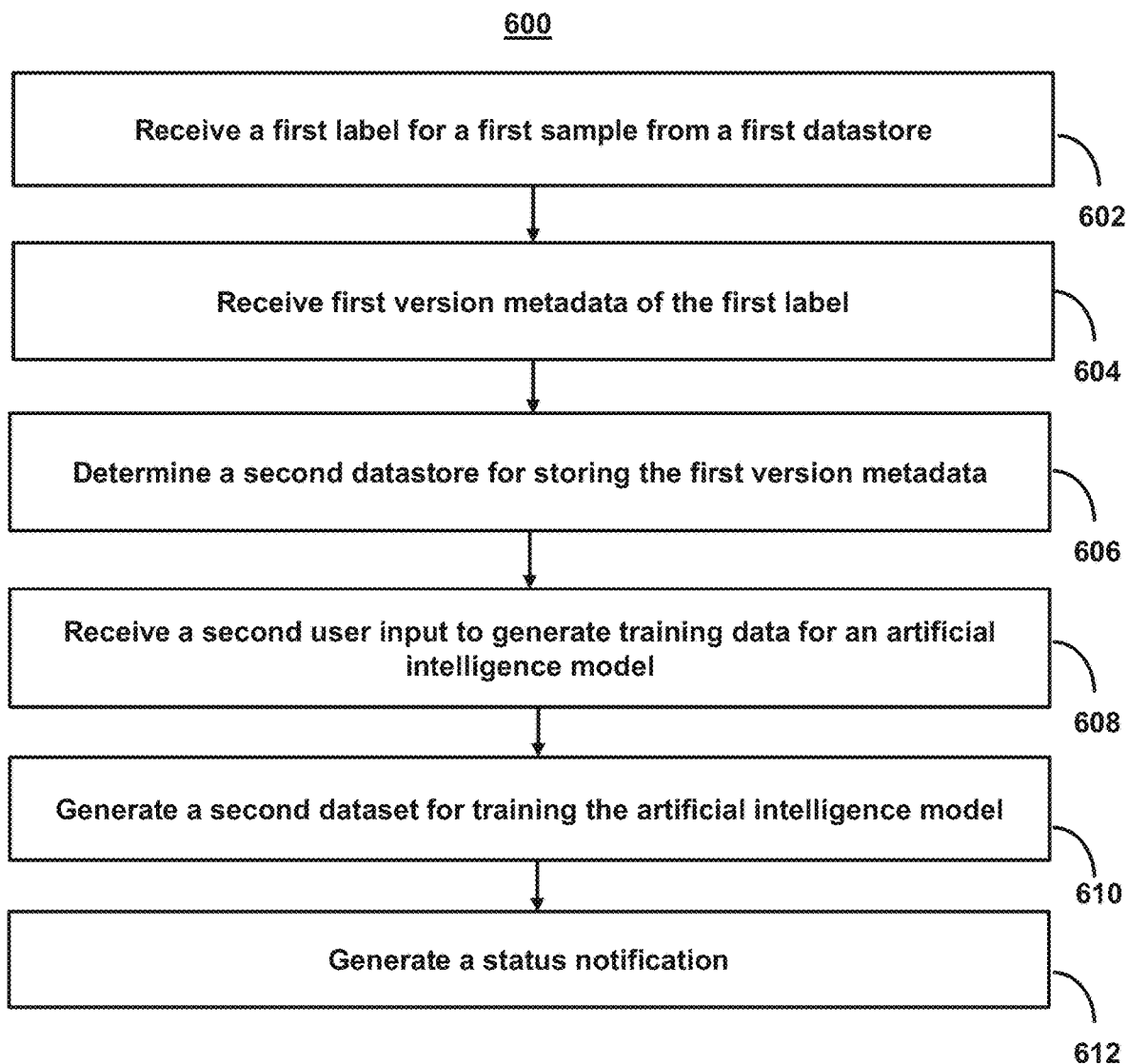
FIG. 6 shows a flowchart of the steps involved in storing versioned data while labeling data for artificial intelligence model development, in accordance with one or more embodiments.

FIG. 6 shows a flowchart of the steps involved in storing versioned data while labeling data for artificial intelligence model development, in accordance with one or more embodiments. For example, the system may use process 600 (e.g., as implemented on one or more system components described above) for data labeling.

At step 602, process 600 (e.g., using one or more components described above) receives a first label for a first sample from a first datastore. For example, the system may receive a first label for a first sample from a first datastore, wherein the first datastore is accessible to a first subset of a plurality of users, and wherein the first datastore comprises a relational database. For example, the system may use a bifurcated data management arrangement in which certain data and/or datasets are only available (or accessible) to specific users. The availability and/or accessibility of the data and/or dataset may be defined by an attribute of the user (or user group). For example, the attribute may comprise any characteristic that distinguishes one user (or user group) from another. For example, an attribute may comprise a role of a user, a task assigned/performed by a user, a permission or security credential of the user, a workspace of the user, etc.

In some embodiments, the first database may comprise a relational database. As such, the datastore may contain multiple tables of data that relate to each other and allows the user to specify information about multiple tables and the relationships between those tables, allowing more flexibility and control over database constraints. For example, the system may access a first table of the first datastore. The system may determine a relationship of the first table to a second table in the first datastore. The system may access a second table of the first datastore based on the relationship. The system may retrieve the first label from the second table.

In some embodiments, the system may receive data from multiple sources. By doing so, the system may avoid copying data to multiple locations and straining computing resources. Additionally, as the system only stores specific information (e.g., labels in a first datastore, samples in a third datastore, and version metadata in a second datastore), modifications to any of the data only affects data in a specific datastore. Accordingly, a user may modify version metadata for a specific workspace without affecting the underlying label sample. For example, the system may query a third datastore for the first sample, wherein the third datastore is accessible to a third subset of the plurality of users, and wherein the third datastore comprises unlabeled data sourced from the first datastore. The system may query the first datastore for the first label, wherein the first datastore comprises a plurality of labeled data archives, wherein each of the plurality of labeled data archives is specific to a respective workspace.

In some embodiments, the first datastore may comprise a relational database service that pushes changes to a specific archive (e.g., corresponding to a given workspace). Each archive may itself have a project database service that may store workspace, project, and task-specific information. For example, the system may determine a first labeled data archive corresponding to a current workspace. The system may retrieve the first label from the first labeled data archive.

In some embodiments, the system may require a user to have a particular attribute or attributes to access different types of data. These attributes may comprise a role, an authorization, a relationship to a given workspace, and/or a security credential. For example, the system may apply different security requirements to the first label, first sample, and/or first dataset than the first version metadata. By doing so, the first version metadata may be more secured (e.g., through more advanced encryption). For example, the system may determine a user requesting the first label. The system may determine a user profile for the user. The system may determine a first credential for accessing the first datastore. The system may determine whether to grant access to the first datastore based on a first comparison of the user profile and the first credential.

At step 604, process 600 (e.g., using one or more components described above) receives first version metadata of the first label. For example, the system may receive first version metadata of the first label. For example, the system may receive one or more user inputs that generate metadata for a label. In some embodiments, this metadata may comprise a new version of a label (or modification to an existing label). Additionally or alternatively, the version metadata may comprise additional information used to determine a consistency or other characteristic.

The system may receive one or more inputs into a user interface for a workspace. The one or more inputs may cause data within the workspace to be modified and/or stored in the workspace. Notably, the data outside the workspace (e.g., data from other datasets) is not affected. For example, the system may receive a third user input of a proposed label for the first sample as assigned by a first user. The system may receive a fourth user input to store the proposed label to the first sample in the second datastore. The system may update a first record in the second datastore with a proposed label for the first sample as assigned by a first user. The system may update a second record in the second datastore with a pointer to a location of the first sample.

Using a flat-file database, the system may dedicate a record (e.g., a row) in the two-dimensional database to a respective version metadata for a respective sample. As such, the system may continually add additional records without modifying previous records. Additionally, by dedicating a row to each sample, the system does not have character limits for each sample, which allows for less restrictions on formatting. For example, the system may receive second version metadata of a second label, wherein the second version metadata comprises a proposed label for a second sample assigned by a first user. The system may determine the second datastore for storing the second version metadata, wherein the second version metadata is assigned to a second row of the two-dimensional database.

At step 606, process 600 (e.g., using one or more components described above) determines a second datastore for storing the first version metadata. For example, the system may determine a second datastore for storing the first version metadata, wherein the second datastore is accessible to a second subset of the plurality of users, and wherein the second subset comprises a two-dimensional database, and wherein the first version metadata is assigned to a first row of the two-dimensional database. For example, the system may store the first version metadata separately from the first label (e.g., the current label for a sample) as well as the first sample. By doing so, the system may preserve storage space while also allowing other users and/or workspaces to access the first label and/or first sample.

At step 608, process 600 (e.g., using one or more components described above) receives a second user input to generate training data for an artificial intelligence model. For example, the system may receive a second user input to generate training data for an artificial intelligence model based on version metadata of labels in the second datastore. For example, the system may receive a request to access training data for use in a workspace.

At step 610, process 600 (e.g., using one or more components described above) generates a second dataset for training the artificial intelligence model. For example, the system may, in response to the second user input, generate a second dataset for training the artificial intelligence model based on the version metadata of the labels in the second datastore. For example, the system may retrieve the various version metadata labels for the workspace and generate a set of training data based on them. As such, the training data is specific to the workspace.

For example, the system may maintain separate access requirements (e.g., users may require different security credentials) for different data. The system may require users to have a first level of access to access a first dataset and/or datastore and a second level of access to access a second dataset. For example, the system may determine the user requesting the second dataset. The system may determine the user profile for the user. The system may determine a second credential for accessing the second dataset. The system may determine whether to grant access to the second dataset based on a comparison of the user profile and a credential requirement.

At step 612, process 600 (e.g., using one or more components described above) generates a status notification. For example, the system may generate for display, in a user interface, a status notification for generation of the second dataset. The system may generate information about the training data such as characteristics of the training data, results from use of the training data, comparisons of the training data with other datasets (e.g., from the first dataset), etc.

In some embodiments, the system may generate information about a sample, label, and/or other information that may be used to compare training data from different datasets (and/or workspaces). For example, the system may describe a number, size, average confidence level, average consistency level, etc. for a given dataset (or workspace). The system may then compare this metric to generate recommendations about the quality of a current dataset. By doing so, the system may predict whether a current dataset is likely to suffer bias or other issues related to the data used. For example, the system may determine a first metric for samples in the first datastore. The system may determine a second metric for samples in the second dataset. The system may generate for display a comparison of the first metric and second metric.

In some embodiments, the system may receive additional annotations to metadata, a label, a sample, and/or a dataset. The system may limit the application of this annotation to data in a given workspace (e.g., in a given dataset). The system may receive a user annotation to the second dataset. The system may store the user annotation in the second dataset.

In some embodiments, the system may receive additional annotations to metadata, a label, a sample, and/or a dataset. The system may then automatically apply this annotation to the metadata for other labels in the workspace. By doing so, the system may quickly and efficiently populate changes to training data in a given workspace. For example, the system may generate for display an option to annotate the first version metadata. The system may receive an annotation to the first version metadata. The system may automatically modify, based on the annotation, the version metadata of labels in the second datastore.

In some embodiments, the system may use a flat-file database to ease review and/or retrieval of data. Flat-file databases are useful as easy-to-create and easy-to-maintain date files for commonly accessed information such as name and address files, labels, etc. A flat-file database's simplicity is advantageous as a low-overhead, easy-to-access way to store voluminous information that needs to be preserved in its native state. For example, the system may retrieve the version metadata of labels from the second datastore. In some embodiments, the system may use a flat-file database to ease comparison of data and/or in the management of object-oriented storage systems. Object storage is commonly used by cloud storage services because it can accommodate massive volumes of data. The data stored on object systems is managed by a non-hierarchical flat-file database that retains basic information about the data, such as the file names and where they are stored on media. The system may compare the version metadata of labels for consistency, and the system may determine that the version metadata of labels has a threshold level of consistency. For example, the system may compare similar version metadata for a label to previous versions to ensure quality and/or consistency.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
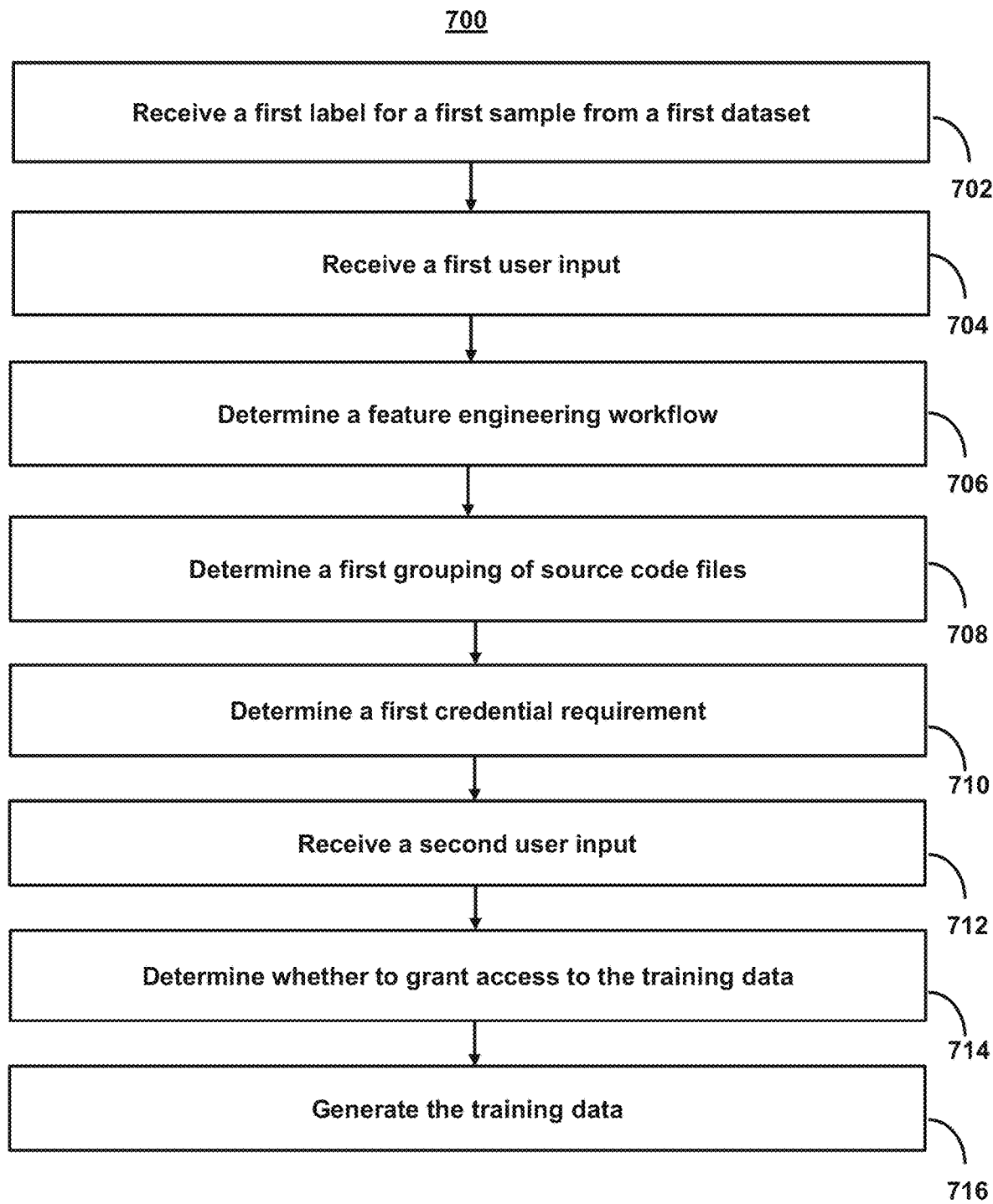
FIG. 7 shows a flowchart of the steps involved in monitoring feature engineering workflows while labeling data for artificial intelligence model development, in accordance with one or more embodiments.

FIG. 7 shows a flowchart of the steps involved in monitoring feature engineering workflows while labeling data for artificial intelligence model development, in accordance with one or more embodiments. For example, the system may use process 700 (e.g., as implemented on one or more system components described above) for data labeling.

At step 702, process 700 (e.g., using one or more components described above) receives a first label for a first sample from a first dataset. For example, the system may receive a first label for a first sample from a first dataset, wherein the first dataset is accessible to a first subset of a plurality of users. For example, the system may use a bifurcated data management arrangement in which certain data and/or datasets are only available (or accessible) to specific users. The availability and/or accessibility of the data and/or dataset may be defined by an attribute of the user (or user group). For example, the attribute may comprise any characteristic that distinguishes one user (or user group) from another. For example, an attribute may comprise a role of a user, a task assigned/performed by a user, a permission or security credential of the user, a workspace of the user, etc.

In some embodiments, the first dataset may be retrieved from a relational database. As such, the dataset may contain multiple tables of data that relate to each other and allows the user to specify information about multiple tables and the relationships between those tables, allowing more flexibility and control over database constraints. For example, the system may access a first table of the first dataset. The system may determine a relationship of the first table to a second table in the first dataset. The system may access a second table of the first dataset based on the relationship. The system may retrieve the first label from the second table.

In some embodiments, the system may receive data from multiple sources. By doing so, the system may avoid copying data to multiple locations and straining computing resources. Additionally, as the system only stores specific information (e.g., labels in a first datastore, samples in a third datastore, and version metadata in a second datastore), modifications to any of the data only affect data in a specific datastore. Accordingly, a user may modify version metadata for a specific workspace without affecting the underlying label sample. For example, the system may query a third datastore for the first sample, wherein the third datastore is accessible to a third subset of the plurality of users, and wherein the third datastore comprises unlabeled data sourced from the first dataset. The system may query the first dataset for the first label, wherein the first dataset comprises a plurality of labeled data archives, wherein each of the plurality of labeled data archives is specific to a respective workspace.

In some embodiments, the first datastore may comprise a relational database service that pushes changes to a specific archive (e.g., corresponding to a given workspace). Each archive may itself have a project database service that may store workspace, project, and task-specific information. For example, the system may determine a first labeled data archive corresponding to a current workspace. The system may retrieve the first label from the first labeled data archive.

At step 704, process 700 (e.g., using one or more components described above) receives a first user input. For example, the system may receive a first user input to generate first version metadata of the first label. For example, the system may receive one or more user inputs that generate metadata for a label. In some embodiments, this metadata may comprise a new version of a label (or modification to an existing label). Additionally or alternatively, the version metadata may comprise additional information used to determine a consistency or other characteristic.

At step 706, process 700 (e.g., using one or more components described above) determines a feature engineering workflow. For example, the system may, in response to receiving the first user input, determine a feature engineering workflow for generating the first version metadata. For example, the system may select the one or more features needed to accomplish a feature engineering task. For example, each feature node (e.g., node 162 or node 164 (FIG. 1D)) may correspond to one or more transformations and/or other process applied to data during the feature engineering process. The combination of these transformations may comprise a feature engineering workflow (e.g., workflow 160 (FIG. 1D)). Furthermore, each feature node may comprise additional tasks (e.g., an additional subset of transformations) corresponding to each feature node. These additional nodes (e.g., node 166 (FIG. 1D)) may also comprise additional transformations.

At step 708, process 700 (e.g., using one or more components described above) determines a first grouping of source code files. For example, the system may determine, based on the feature engineering workflow, a first grouping of source code files corresponding to the feature engineering workflow. For example, the system may determine a specific workspace and/or labeled data archive for storing data.

In some embodiments, the system may store additional information in a workspace (or archived storage for the workspace). For example, as described in FIG. 2, the workspace may include information on projects, tasks, etc. This information may also include requirements for accessing the information. For example, the system may determine a first task of the feature engineering workflow. The system may adjust, based on the first task, the first credential requirement for accessing the first version metadata.

In some embodiments, the system may store additional information in a workspace (or archived storage for the workspace) such as which user or users are responsible for a given task. As such, the system may direct a given task to a given user. For example, the system may determine a first user for performing the first task. The system may generate a notification to the first user.

In some embodiments, the system may allow a user to monitor the progress of a feature engineering workflow. Furthermore, the system may assign different attributes (e.g., security credential requirements, roles associated with tasks, etc.) based on a current progress point. For example, the system may determine a current progress point of the feature engineering workflow. The system may determine a first feature node in the feature engineering workflow corresponding to the current progress point. The system may determine first feature transformation data corresponding to the first feature node. The system may determine, based on the first feature transformation data, that the first grouping of source code files corresponds to the feature engineering workflow.

Additionally, the system may direct data to particular workspaces based on those workspaces being assigned to a particular task needed to be performed or to a particular user that may perform a task. For example, the system may determine a current progress point of the feature engineering workflow. The system may determine a first feature node in the feature engineering workflow corresponding to the current progress point. The system may determine a first user responsible for performing tasks corresponding to the first feature node. The system may determine that the first user has access to the first grouping of source code files. The system may determine, based on the first user having access to the first grouping of source code files, that the first grouping of source code files corresponds to the feature engineering workflow.

At step 710, process 700 (e.g., using one or more components described above) determines a first credential requirement. For example, the system may determine, based on the first grouping of source code files, a first credential requirement for accessing the first version metadata.

At step 712, process 700 (e.g., using one or more components described above) receives a second user input. For example, the system may receive, from a second user, a second user input requesting access to training data for an artificial intelligence model based on version metadata of labels in the first grouping of source code files.

At step 714, process 700 (e.g., using one or more components described above) determines whether to grant access to the training data. For example, the system may, in response to the second user input, determine whether to grant access to the training data based on a first comparison of user profile data for the second user and the first credential requirement.

At step 716, process 700 (e.g., using one or more components described above) generates the training data. For example, the system may generate for display, in a user interface, the training data based on the first comparison. For example, the system may determine a first metric for samples in the first dataset. The system may determine a second metric for samples in the training data. The system may generate for display a comparison of the first metric and the second metric.

In some embodiments, the system may generate information about a sample, label, and/or other information that may assist a user and/or other system in reviewing a labeling decision. In some embodiments, the system may review a labeling decision for consistency. For example, the system may generate for display native data corresponding to the first sample. The system may generate for display feature transformation data for the first sample. Additionally or alternatively, the system may retrieve the version metadata of labels from the training data. The system may compare the version metadata of labels for consistency. The system may determine that the version metadata of labels has a threshold level of consistency.

In some embodiments, the system may allow a user to edit information about a sample, label, and/or other data. Furthermore, the system may allow this information to be populated across other metadata in the workspace. For example, the system may generate for display an option to annotate the first version metadata. The system may receive an annotation to the first version metadata. The system may automatically modify, based on the annotation, the version metadata of labels in the first grouping of source code files.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for maintaining bifurcated data management while labeling data for artificial intelligence model development.

2. The method of any one of the preceding embodiments, further comprising: receiving a first label for a first sample from a first dataset, wherein the first dataset is accessible to a first subset of a plurality of users, and wherein the first subset comprises a first attribute; receiving first version metadata of the first label, wherein the first version metadata comprises a proposed label for the first sample assigned by a first user; determining, based on a first user input from the first user, a first grouping of source code files for storing the first version metadata, wherein the first grouping of source code files is accessible to a second subset of the plurality of users, and wherein the second subset comprises a second attribute; receiving a second user input to generate training data for an artificial intelligence model based on version metadata of labels in the first grouping of source code files; in response to the second user input, generating a second dataset for training the artificial intelligence model based on the version metadata of the labels in the first grouping of source code files; and generating for display, in a user interface, a status notification for generation of the second dataset.

3. The method of any one of the preceding embodiments, wherein receiving the first version metadata of the first label further comprises: determining a label category for the first label; retrieving a known label having the label category; and comparing a consistency between the first label and the known label.

4. The method of any one of the preceding embodiments, wherein receiving the first version metadata of the first label further comprises: generating for display the first label simultaneously with a known label; and receiving a user confirmation that the first label is consistent with the known label.

5. The method of any one of the preceding embodiments, wherein receiving the first version metadata of the first label further comprises: receiving a label category for the first label; and receiving a confidence level of the first label, wherein the confidence level indicates a likelihood that the first label is consistent with other labels in the label category.

6. The method of any one of the preceding embodiments, wherein receiving the first version metadata of the first label further comprises: receiving a threshold confidence level for the first grouping of source code files; and comparing the confidence level to the threshold confidence level.

7. The method of any one of the preceding embodiments, wherein generating the status notification further comprises: generating for display native data corresponding to the first sample; and generating for display feature transformation data for the first sample.

8. The method of any one of the preceding embodiments, wherein generating the status notification further comprises: determining a total number of samples in the second dataset; and generating for display the total number of samples.

9. The method of any one of the preceding embodiments, wherein generating the status notification further comprises: determining a first metric for samples in the first dataset; determining a second metric for samples in the second dataset; and generating for display a comparison of the first metric and second metric.

10. The method of any one of the preceding embodiments, wherein generating the status notification further comprises: receiving a user annotation to the second dataset; and storing the user annotation in the second dataset.

11. The method of any one of the preceding embodiments, wherein generating the status notification further comprises: generating for display an option to annotate the first version metadata; receiving an annotation to the first version metadata; and automatically modifying, based on the annotation, the version metadata of labels in the first grouping of source code files.

12. The method of any one of the preceding embodiments, wherein determining the first grouping of source code files for storing the first version metadata further comprises: determining a credential requirement for accessing the first grouping of source code files; and comparing the second attribute to the credential requirement.

13. The method of any one of the preceding embodiments, further comprising: receiving a third user input to access the first version metadata; and determining whether to grant access to the first version metadata based on a first comparison of user profile data and a first credential requirement.

14. The method of any one of the preceding embodiments, further comprising: receiving a fourth user input to access the first label; and determining whether to grant access to the first label based on a fourth comparison of the user profile data and a second credential requirement.

15. The method of any one of the preceding embodiments, wherein receiving the first label from the first dataset further comprises: determining a user requesting the first label; determining a user profile for the user; determining a first credential for accessing the first dataset; and determining whether to grant access to the first dataset based on a first comparison of the user profile data and the first credential requirement.

16. A method maintaining rights management while labeling data for artificial intelligence model development.

17. The method of any one of the preceding embodiments, the method comprising: receiving a first label for a first sample from a first dataset, wherein the first dataset is accessible to a first subset of a plurality of users; receiving first version metadata of the first label for the first sample, and wherein the first version metadata is assigned to a first grouping of source code files, wherein the first grouping of source code files is accessible to a second subset of the plurality of users; determining, based on a first user input from a first user, a first credential requirement for accessing the first grouping of source code files; receiving, from a second user, a second user input requesting access to training data for an artificial intelligence model based on version metadata of labels in the first grouping of source code files; in response to the second user input, determining whether to grant access to the training data based on a first comparison of user profile data for the second user and the first credential requirement; and generating for display, in a user interface, the training data based on the first comparison.

18. The method of any one of the preceding embodiments, wherein the first label comprises a second credential requirement, and wherein receiving the first label for the first sample from the first dataset further comprises determining whether to grant access to the first dataset based on a second comparison of the user profile data and the second credential requirement.

19. The method of any one of the preceding embodiments, further comprising: receiving a third user input to access the first version metadata; and determining whether to grant access to the first version metadata based on a third comparison of the user profile data for the second user and a third credential requirement.

20. The method of any one of the preceding embodiments, further comprising: receiving a fourth user input to access the first label; and determining whether to grant access to the first label based on a fourth comparison of the user profile data for the second user and a fourth credential requirement.

21. The method of any one of the preceding embodiments, further comprising: receiving a fifth user input to access the first sample; and determining whether to grant access to the first sample based on a fifth comparison of the user profile data for the second user and a fifth credential requirement.

22. The method of any one of the preceding embodiments, wherein receiving the first version metadata of the first label for the first sample further comprises: receiving a first user input of a proposed label for the first sample as assigned by a first user; and receiving a second user input to store the proposed label to the first sample in the first grouping of source code files.

23. The method of any one of the preceding embodiments, wherein receiving the first version metadata of the first label for the first sample further comprises: updating a first record in the first grouping of source code files with a proposed label for the first sample as assigned by a first user; and updating a second record in the first grouping of source code files with a pointer to a location of the first sample.

24. The method of any one of the preceding embodiments, wherein receiving the first version metadata of the first label further comprises: receiving a label category for the first label; and receiving a confidence level of the first label, wherein the confidence level indicates a likelihood that the first label is consistent with other labels in the label category.

25. The method of any one of the preceding embodiments, wherein receiving the first version metadata of the first label further comprises: receiving a threshold confidence level for the first grouping of source code files; and comparing the confidence level to the threshold confidence level.

26. The method of any one of the preceding embodiments, wherein generating the training data further comprises: generating for display native data corresponding to the first sample; and generating for display feature transformation data for the first sample.

27. The method of any one of the preceding embodiments, wherein generating the training data further comprises: determining a total number of samples in the training data; and generating for display the total number of samples.

28. The method of any one of the preceding embodiments, wherein receiving the first label for the first sample from the first dataset further comprises: determining a first labeled data archive corresponding to a current workspace; and retrieving the first label from the first labeled data archive.

29. The method of any one of the preceding embodiments, further comprising: retrieving the version metadata of labels from the first grouping of source code files; comparing the version metadata of labels for consistency; and determining that the version metadata of labels have a threshold level of consistency.

30. A method for storing versioned data while labeling data for artificial intelligence model development.

31. The method of any one of the preceding embodiments, the method comprising: receiving a first label for a first sample from a first datastore, wherein the first datastore is accessible to a first subset of a plurality of users, and wherein the first datastore comprises a relational database; receiving first version metadata of the first label; determining a second datastore for storing the first version metadata, wherein the second datastore is accessible to a second subset of the plurality of users, and wherein the second subset comprises a two-dimensional database, and wherein the first version metadata is assigned to a first row of the two-dimensional database; receiving a second user input to generate training data for an artificial intelligence model based on version metadata of labels in the second datastore; in response to the second user input, generating a second dataset for training the artificial intelligence model based on the version metadata of the labels in the second datastore; and generating for display, in a user interface, a status notification for generation of the second dataset.

32. The method of any one of the preceding embodiments, further comprising: retrieving the version metadata of labels from the second datastore; comparing the version metadata of labels for consistency; and determining that the version metadata of labels have a threshold level of consistency.

33. The method of any one of the preceding embodiments, further comprising: receiving second version metadata of a second label, wherein the second version metadata comprises a proposed label for a second sample assigned by a first user; and determining the second datastore for storing the second version metadata, wherein the second version metadata is assigned to a second row of the two-dimensional database.

34. The method of any one of the preceding embodiments, wherein receiving the first label for the first sample from the first datastore further comprises: accessing a first table of the first datastore; determining a relationship of the first table to a second table in the first datastore; accessing a second table of the first datastore based on the relationship; and retrieving the first label from the second table.

35. The method of any one of the preceding embodiments, wherein receiving the first label for the first sample from the first datastore further comprises: querying a third datastore for the first sample, wherein the third datastore is accessible to a third subset of the plurality of users, and wherein the third datastore comprises unlabeled data sourced from the first datastore; and querying the first datastore for the first label, wherein the first datastore comprises a plurality of labeled data archives, wherein each of the plurality of labeled data archives is specific to a respective workspace.

36. The method of any one of the preceding embodiments, wherein receiving the first label for the first sample from the first datastore further comprises: determining a first labeled data archive corresponding to a current workspace; and retrieving the first label from the first labeled data archive.

37. The method of any one of the preceding embodiments, wherein generating the status notification further comprises: determining a first metric for samples in the first datastore; determining a second metric for samples in the second dataset; and generating for display a comparison of the first metric and second metric.

38. The method of any one of the preceding embodiments, wherein generating the status notification further comprises: receiving a user annotation to the second dataset; and storing the user annotation in the second dataset.

39. The method of any one of the preceding embodiments, wherein generating the status notification further comprises: generating for display an option to annotate the first version metadata; receiving an annotation to the first version metadata; and automatically modifying, based on the annotation, the version metadata of labels in the second datastore.

40. The method of any one of the preceding embodiments, wherein receiving the first label for the first sample from the first datastore further comprises: determining a user requesting the first label; determining a user profile for the user; determining a first credential for accessing the first datastore; and determining whether to grant access to the first datastore based on a first comparison of the user profile and the first credential.

41. The method of any one of the preceding embodiments, wherein generating the second dataset for training the artificial intelligence model based on the version metadata of the labels in the second datastore further comprises: determining the user requesting the second dataset; determining the user profile for the user; determining a second credential for accessing the second dataset; and determining whether to grant access to the second dataset based on a comparison of the user profile and a credential requirement.

42. The method of any one of the preceding embodiments, wherein receiving the first version metadata of the first label further comprises: receiving a third user input of a proposed label for the first sample as assigned by a first user; and receiving a fourth user input to store the proposed label to the first sample in the second datastore.

43. The method of any one of the preceding embodiments, wherein receiving the first version metadata of the first label further comprises: updating a first record in the second datastore with a proposed label for the first sample as assigned by a first user; and updating a second record in the second datastore with a pointer to a location of the first sample.

44. A method for monitoring feature engineering workflows while labeling data for artificial intelligence model development.

45. The method of any one of the preceding embodiments, the method comprising: receiving a first label for a first sample from a first dataset, wherein the first dataset is accessible to a first subset of a plurality of users; receiving a first user input to generate first version metadata of the first label; in response to receiving the first user input, determining a feature engineering workflow for generating the first version metadata; determining, based on the feature engineering workflow, a first grouping of source code files corresponding to the feature engineering workflow; determining, based on the first grouping of source code files, a first credential requirement for accessing the first version metadata; receiving, from a second user, a second user input requesting access to training data for an artificial intelligence model based on version metadata of labels in the first grouping of source code files; in response to the second user input, determining whether to grant access to the training data based on a first comparison of user profile data for the second user and the first credential requirement; and generating for display, in a user interface, the training data based on the first comparison.

46. The method of any one of the preceding embodiments, wherein determining, based on the first grouping of source code files, the first credential requirement for accessing the first version metadata further comprises: determining a first task of the feature engineering workflow; and adjusting, based on the first task, the first credential requirement for accessing the first version metadata.

47. The method of any one of the preceding embodiments, wherein determining, based on the first grouping of source code files, the first credential requirement for accessing the first version metadata further comprises: determining a first user for performing the first task; and generating a notification to the first user.

48. The method of any one of the preceding embodiments, wherein determining, based on the feature engineering workflow, the first grouping of source code files corresponding to the feature engineering workflow further comprises: determining a current progress point of the feature engineering workflow; determining a first feature node in the feature engineering workflow corresponding to the current progress point; determining first feature transformation data corresponding to the first feature node; and determining, based on the first feature transformation data, that the first grouping of source code files corresponds to the feature engineering workflow.

49. The method of any one of the preceding embodiments, wherein determining, based on the feature engineering workflow, the first grouping of source code files corresponding to the feature engineering workflow further comprises: determining a current progress point of the feature engineering workflow; determining a first feature node in the feature engineering workflow corresponding to the current progress point; determining a first user responsible for performing tasks corresponding to the first feature node; determining that the first user has access to the first grouping of source code files; and determining, based on the first user having access to the first grouping of source code files, that the first grouping of source code files corresponds to the feature engineering workflow.

50. The method of any one of the preceding embodiments, wherein generating the training data further comprises: generating for display native data corresponding to the first sample; and generating for display feature transformation data for the first sample.

51. The method of any one of the preceding embodiments, wherein generating the training data further comprises: determining a first metric for samples in the first dataset; determining a second metric for samples in the training data; and generating for display a comparison of the first metric and the second metric.

52. The method of any one of the preceding embodiments, wherein generating the training data further comprises: receiving a user annotation to the training data; and storing the user annotation in the training data.

53. The method of any one of the preceding embodiments, wherein generating the training data further comprises: generating for display an option to annotate the first version metadata; receiving an annotation to the first version metadata; and automatically modifying, based on the annotation, the version metadata of labels in the first grouping of source code files.

54. The method of any one of the preceding embodiments, wherein receiving the first label for the first sample from the first dataset further comprises: accessing a first table of the first dataset; determining a relationship of the first table to a second table in the first dataset; accessing a second table of the first dataset based on the relationship; and retrieving the first label from the second table.

55. The method of any one of the preceding embodiments, wherein receiving the first label for the first sample from the first dataset further comprises: querying a third datastore for the first sample, wherein the third datastore is accessible to a third subset of the plurality of users, and wherein the third datastore comprises unlabeled data sourced from the first dataset; and querying the first dataset for the first label, wherein the first dataset comprises a plurality of labeled data archives, wherein each of the plurality of labeled data archives is specific to a respective workspace.

56. The method of any one of the preceding embodiments, wherein receiving the first label for the first sample from the first dataset further comprises: determining a first labeled data archive corresponding to a current workspace; and retrieving the first label from the first labeled data archive.

57. The method of any one of the preceding embodiments, further comprising: retrieving the version metadata of labels from the training data; comparing the version metadata of labels for consistency; and determining that the version metadata of labels have a threshold level of consistency.

58. A tangible, non-transitory, machine-readable medium storing instructions that, when executed by a data processing apparatus, cause the data processing apparatus to perform operations comprising those of any of embodiments 1-58.

59. A system comprising one or more processors; and memory storing instructions that, when executed by the processors, cause the processors to effectuate operations comprising those of any of embodiments 1-10.

60. A system comprising means for performing any of embodiments 1-58.

What is claimed is:

1. A system for maintaining bifurcated data management while labeling data for artificial intelligence model development, the system comprising:

a first datastore, wherein the first datastore is accessible to a first subset of a plurality of users, wherein the first subset of the plurality of users comprises a first attribute, wherein the first datastore comprises a first dataset, and wherein the first datastore comprises a relational database that stores a plurality of samples;

a second datastore, wherein the second datastore is specific to a first grouping of source code files, wherein the first grouping of source code files is accessible to a second subset of the plurality of users, wherein the second subset comprises a second attribute, and wherein the second datastore comprises a labeled data archive specific to the first grouping of source code files;

a third datastore, wherein the third datastore is accessible to a third subset of the plurality of users, wherein the third subset comprises a third attribute, and wherein the third datastore comprises unlabeled data sourced from the first datastore;

one or more preprocessors; and a non-transitory computer readable medium comprising instructions that when executed by the one or more preprocessors cause operations comprising:

receiving a first label for a first sample from the first dataset;

receiving first version metadata of the first label, wherein the first version metadata comprises a proposed label for the first sample assigned by a first user;

determining, based on a first user input from the first user, the first grouping of source code files for storing the first version metadata of the first label;

determining a credential requirement for accessing the first grouping of source code files;

comparing the second attribute associated with the second subset of the plurality of users to the credential requirement;

based on the second attribute matching the credential requirement, determining that the first grouping of source code files is accessible to the second subset of the plurality of users;

receiving a second user input to generate training data for an artificial intelligence model based on version metadata of labels in the first grouping of source code files;

in response to the second user input, generating a second dataset for training the artificial intelligence model based on the version metadata of the labels in the first grouping of source code files; and generating for display, in a user interface, a status notification for generation of the second dataset.

2. A method maintaining bifurcated data management while labeling data for artificial intelligence model development, the method comprising:

receiving a first label for a first sample from a first dataset, wherein the first dataset is accessible to a first subset of a plurality of users, and wherein the first subset of the plurality of users comprises a first attribute;

receiving first version metadata of the first label, wherein the first version metadata comprises a proposed label for the first sample assigned by a first user;

determining, based on a first user input from the first user, a first grouping of source code files for storing the first version metadata, determining a credential requirement for accessing the first grouping of source code files;

comparing a second attribute associated with a second subset of the plurality of users to the credential requirement;

based on the second attribute matching the credential requirement, determining that the first grouping of source code files is accessible to the second subset of the plurality of users;

receiving a second user input to generate training data for an artificial intelligence model based on version metadata of labels in the first grouping of source code files;

in response to the second user input, generating a second dataset for training the artificial intelligence model based on the version metadata of the labels in the first grouping of source code files; and generating for display, in a user interface, a status notification for generation of the second dataset.

3. The method of claim 2, wherein receiving the first version metadata of the first label further comprises:

determining a label category for the first label;

retrieving a known label having the label category; and comparing a consistency between the first label and the known label.

4. The method of claim 2, wherein receiving the first version metadata of the first label further comprises:

generating for display the first label simultaneously with a known label; and receiving a user confirmation that the first label is consistent with the known label.

5. The method of claim 2, wherein receiving the first version metadata of the first label further comprises:

receiving a label category for the first label; and receiving a confidence level of the first label, wherein the confidence level indicates a likelihood that the first label is consistent with other labels in the label category.

6. The method of claim 5, wherein receiving the first version metadata of the first label further comprises:

receiving a threshold confidence level for the first grouping of source code files; and comparing the confidence level to the threshold confidence level.

7. The method of claim 2, wherein generating the status notification further comprises:

generating for display native data corresponding to the first sample; and generating for display feature transformation data for the first sample.

8. The method of claim 2, wherein generating the status notification further comprises:

determining a total number of samples in the second dataset; and generating for display the total number of samples.

9. The method of claim 2, wherein generating the status notification further comprises:

determining a first metric for samples in the first dataset;

determining a second metric for samples in the second dataset; and generating for display a comparison of the first metric and the second metric.

10. The method of claim 2, wherein generating the status notification further comprises:

receiving a user annotation to the second dataset; and storing the user annotation in the second dataset.

11. The method of claim 2, wherein generating the status notification further comprises:

generating for display an option to annotate the first version metadata;

receiving an annotation to the first version metadata; and automatically modifying, based on the annotation, the version metadata of labels in the first grouping of source code files.

12. The method of claim 2, further comprising:

receiving a third user input to access the first version metadata; and determining whether to grant access to the first version metadata based on a first comparison of user profile data and a first credential requirement.

13. The method of claim 12, further comprising:

receiving a fourth user input to access the first label; and determining whether to grant access to the first label based on a fourth comparison of the user profile data and a second credential requirement.

14. The method of claim 12, wherein receiving the first label from the first dataset further comprises:

determining a user requesting the first label;

determining a user profile for the user;

determining a first credential for accessing the first dataset; and determining whether to grant access to the first dataset based on a first comparison of the user profile data and the first credential requirement.

15. A non-transitory computer readable medium comprising instructions that when executed by one or more preprocessors cause operations comprising:

receiving a first label for a first sample from a first dataset, wherein the first dataset is accessible to a first subset of a plurality of users, and wherein the first subset comprises a first attribute;

receiving first version metadata of the first label, wherein the first version metadata comprises a proposed label for the first sample assigned by a first user;

determining, based on a first user input from the first user, a first grouping of source code files for storing the first version metadata, determining a credential requirement for accessing the first grouping of source code files;

comparing a second attribute associated with a second subset of the plurality of users to the credential requirement;

based on the second attribute matching the credential requirement, determining that the first grouping of source code files is accessible to the second subset of the plurality of users;

receiving a second user input to generate training data for an artificial intelligence model based on version metadata of labels in the first grouping of source code files;

in response to the second user input, generating a second dataset for training the artificial intelligence model based on the version metadata of the labels in the first grouping of source code files; and generating for display, in a user interface, a status notification for generation of the second dataset.

16. The non-transitory computer readable medium of claim 15, wherein receiving the first version metadata of the first label further comprises:

determining a label category for the first label;

retrieving a known label having the label category; and comparing a consistency between the first label and the known label.

17. The non-transitory computer readable medium of claim 15, wherein receiving the first version metadata of the first label further comprises:

generating for display the first label simultaneously with a known label; and receiving a user confirmation that the first label is consistent with the known label.

18. The non-transitory computer readable medium of claim 15, wherein receiving the first version metadata of the first label further comprises:

receiving a label category for the first label; and receiving a confidence level of the first label, wherein the confidence level indicates a likelihood that the first label is consistent with other labels in the label category.

19. The non-transitory computer readable medium of claim 18, wherein receiving the first version metadata of the first label further comprises:

receiving a threshold confidence level for the first grouping of source code files; and comparing the confidence level to the threshold confidence level.

* * * * *